(12) United States Patent
Schneider et al.

(10) Patent No.: US 11,594,865 B2
(45) Date of Patent: Feb. 28, 2023

(54) FLOOR POWER DISTRIBUTION SYSTEM

(71) Applicant: Steelcase Inc., Grand Rapids, MI (US)

(72) Inventors: Mark A. Schneider, Byron Center, MI (US); David K. Jones, Grand Rapids, MI (US); Jamie Payne, Grand Rapids, MI (US); Cody Jay Holstege, Zeeland, MI (US)

(73) Assignee: Steelcase Inc., Grand Rapids, MI (US)

( * ) Notice: Subject to any disclaimer, the term of this patent is extended or adjusted under 35 U.S.C. 154(b) by 0 days.

(21) Appl. No.: 17/338,875

(22) Filed: Jun. 4, 2021

(65) Prior Publication Data

US 2021/0296868 A1 Sep. 23, 2021

Related U.S. Application Data

(63) Continuation of application No. 16/687,031, filed on Nov. 18, 2019, now Pat. No. 11,063,411, which is a
(Continued)

(51) Int. Cl.
*H01R 13/447* (2006.01)
*H02G 3/04* (2006.01)
(Continued)

(52) U.S. Cl.
CPC ......... *H02G 3/0437* (2013.01); *H01R 13/447* (2013.01); *H01R 13/5202* (2013.01);
(Continued)

(58) Field of Classification Search
CPC .. H02G 3/0437; H02G 3/0431; H02G 3/0493; H02G 3/185; H02G 9/025;
(Continued)

(56) References Cited

U.S. PATENT DOCUMENTS 126,590 A 5/1872 Townseot
132,563 A 10/1872 Daniel
(Continued)

FOREIGN PATENT DOCUMENTS

AU 199540717 A1 8/1999
DE 19959268 A1 4/2001
(Continued)

OTHER PUBLICATIONS

Sistemy raspredeleniya elektrichestva pod polom (63-80A), EAE Elektrik, Dabline, Sep. 19, 2013, Retrieved from the nternet, 20 pages, http://www.eae-web.com/PageGalleryFiles/PdfFiles/DABLINE_rus.pd. t>.

*Primary Examiner* — Tho D Ta
(74) *Attorney, Agent, or Firm* — Price Heneveld LLP

(57) ABSTRACT

A connection arrangement for a floor power distribution system includes a hub arrangement configured to distribute electrical power and including a hub housing and an electrical connector, the hub housing configured to abut a floor, and an adapter configured to engage the hub housing of the hub arrangement and configured to abut the floor, wherein at least a portion of the adapter is cantilevered over at least a portion of the hub housing, wherein the portion of the adapter that is cantilevered over the portion of the hub housing is vertically aligned with the electrical connector of the hub arrangement.

20 Claims, 27 Drawing Sheets

Related U.S. Application Data continuation of application No. 16/403,017, filed on May 3, 2019, now Pat. No. 10,516,255, which is a continuation of application No. 16/028,485, filed on Jul. 6, 2018, now Pat. No. 10,333,284, which is a continuation of application No. 15/585,290, filed on May 3, 2017, now Pat. No. 10,050,424, which is a continuation of application No. 14/850,206, filed on Sep. 10, 2015, now Pat. No. 9,685,730.

(60) Provisional application No. 62/049,483, filed on Sep. 12, 2014, provisional application No. 62/216,051, filed on Sep. 9, 2015.

(51) Int. Cl.
| | |
|---|---|
| *H01R 13/52* | (2006.01) |
| *H01R 25/00* | (2006.01) |
| *H02G 3/18* | (2006.01) |
| *H02G 9/02* | (2006.01) |
| *H02G 3/00* | (2006.01) |
| *H02G 3/14* | (2006.01) |
| *H01R 13/72* | (2006.01) |
| *H02G 11/02* | (2006.01) |

(52) U.S. Cl.
CPC ....... *H01R 13/5221* (2013.01); *H01R 25/006* (2013.01); *H02G 3/0431* (2013.01); *H02G 3/0493* (2013.01); *H02G 3/185* (2013.01); *H02G 9/025* (2013.01); *H01R 13/5219* (2013.01); *H01R 13/72* (2013.01); *H02G 3/00* (2013.01); *H02G 3/14* (2013.01); *H02G 11/02* (2013.01)

(58) Field of Classification Search
CPC .. H02G 11/02; H01R 13/447; H01R 13/5202; H01R 13/5221; H01R 25/006
See application file for complete search history.

(56) References Cited

U.S. PATENT DOCUMENTS

| | | |
|---|---|---|
| 179,081 A | 6/1876 | Thomas |
| 179,082 A | 6/1876 | Van Hoevenbeeah |
| 285,552 A | 9/1883 | Babnabd |
| 426,520 A | 4/1890 | Bennett |
| 470,460 A | 3/1892 | Banta et al. |
| 528,076 A | 10/1894 | Yin |
| 644,180 A | 2/1900 | Lane |
| D52,628 S | 1/1917 | Bissell |
| D52,629 S | 1/1917 | Bissell |
| 1,235,295 A | 7/1917 | De Long |
| 1,358,792 A | 11/1920 | Shogran |
| 1,653,897 A | 12/1927 | Farr |
| 1,761,203 A | 6/1930 | Fox |
| 1,821,580 A | 9/1931 | Rogers |
| D100,082 S | 6/1936 | Wiesmann |
| D126,590 S | 4/1941 | Lewin |
| D132,563 S | 5/1942 | Lewin |
| 2,284,770 A | 6/1942 | Scheuer |
| 2,379,572 A | 7/1945 | Gibson |
| 2,455,131 A | 11/1948 | Masterson |
| D179,081 S | 9/1955 | Hudson |
| D179,082 S | 10/1956 | Hudson |
| 3,029,972 A | 4/1962 | Robbins |
| 3,119,588 A | 1/1964 | Keats |
| 3,223,368 A | 12/1965 | Pollock |
| 3,252,611 A | 5/1966 | Weitzman |
| 3,288,413 A | 11/1966 | Gregory |
| 3,312,931 A | 4/1967 | Keller |
| 3,415,475 A | 12/1968 | Goodman |
| 3,523,156 A | 8/1970 | Phillips |
| 3,596,139 A | 7/1971 | Walsh |
| 3,636,495 A | 1/1972 | Forsyth, Jr. |
| 3,647,937 A | 3/1972 | Jorgensen |
| 3,651,441 A | 3/1972 | Boudouris |
| 3,715,627 A | 2/1973 | Ausilio |
| 3,805,312 A | 4/1974 | Wu |
| 3,814,864 A | 6/1974 | Victoreen |
| 3,852,701 A | 12/1974 | Minitz |
| 3,928,716 A | 12/1975 | Marrero |
| 3,943,325 A | 3/1976 | Pickard |
| 4,030,801 A | 6/1977 | Bunnell |
| 4,124,324 A | 11/1978 | Augis |
| 4,131,760 A | 12/1978 | Christensen |
| 4,134,516 A | 1/1979 | Sullo |
| 4,146,285 A | 3/1979 | Cook |
| 4,154,495 A | 5/1979 | Crewse |
| 4,329,131 A | 5/1982 | Roane |
| 4,437,725 A | 3/1984 | Eaby et al. |
| 4,456,145 A | 6/1984 | Frank |
| 4,559,642 A | 12/1985 | Miyaji et al. |
| D285,552 S | 9/1986 | Schwartz |
| 4,615,113 A | 10/1986 | Fennel |
| 4,623,753 A | 11/1986 | Feldman et al. |
| 4,647,120 A | 3/1987 | Karabakakis |
| 4,699,442 A | 10/1987 | Riches |
| 4,705,342 A | 11/1987 | Schwartz |
| 4,778,400 A | 10/1988 | Jacobs |
| 4,781,609 A | 11/1988 | Wilson et al. |
| 4,784,610 A | 11/1988 | Stuart |
| 4,826,559 A | 5/1989 | Noorily et al. |
| 4,827,080 A | 5/1989 | Castellani et al. |
| 4,832,613 A | 5/1989 | Tsukakoshi |
| 4,875,871 A | 10/1989 | Booty |
| 4,886,465 A | 12/1989 | Warner |
| 4,978,314 A | 12/1990 | Maejima |
| D314,182 S | 1/1991 | Moerman |
| 5,024,614 A | 6/1991 | Dola et al. |
| 5,035,646 A | 7/1991 | Ehrenfels et al. |
| 5,057,647 A | 10/1991 | Bogden et al. |
| 5,064,969 A | 11/1991 | Bloom |
| 5,071,367 A | 12/1991 | Luu |
| 5,084,596 A | 1/1992 | Borsh et al. |
| 5,097,529 A | 3/1992 | Cobb et al. |
| 5,099,382 A | 3/1992 | Eppinger |
| 5,120,237 A | 6/1992 | Fussell |
| 5,187,642 A | 2/1993 | Garner et al. |
| 5,203,713 A | 4/1993 | French et al. |
| 5,223,673 A | 6/1993 | Mason |
| 5,232,381 A | 8/1993 | Yu |
| 5,235,136 A | 8/1993 | Santucci |
| 5,243,129 A | 9/1993 | Bates |
| 5,272,278 A | 12/1993 | Wuertz |
| 5,272,587 A | 12/1993 | Wan |
| 5,336,849 A | 8/1994 | Whitney et al. |
| D354,345 S | 1/1995 | Liu |
| 5,391,088 A | 2/1995 | Tomchak et al. |
| 5,392,571 A | 2/1995 | Greenfield et al. |
| 5,400,409 A | 3/1995 | Linhard et al. |
| 5,401,181 A | 3/1995 | Wilson |
| 5,401,906 A | 3/1995 | Bryant |
| 5,415,557 A | 5/1995 | Chapman et al. |
| 5,422,434 A | 6/1995 | Wuertz et al. |
| 5,430,253 A | 7/1995 | Pratt |
| 5,440,841 A | 8/1995 | Greenfield et al. |
| 5,454,731 A | 10/1995 | Dickie |
| 5,468,908 A | 11/1995 | Arthur et al. |
| 5,472,160 A | 12/1995 | Burek et al. |
| D367,530 S | 2/1996 | Stith |
| 5,490,051 A | 2/1996 | Messana |
| 5,562,490 A | 10/1996 | Rybolt et al. |
| 5,571,023 A | 11/1996 | Anthony |
| 5,574,612 A | 11/1996 | Pak |
| 5,575,674 A | 11/1996 | Davis et al. |
| 5,581,620 A | 12/1996 | Brandstein et al. |
| 5,582,522 A | 12/1996 | Johnson |
| 5,627,340 A | 5/1997 | Smith et al. |
| 5,634,808 A | 6/1997 | Shinji |
| 5,638,758 A | 6/1997 | Carr |
| 5,676,558 A | 10/1997 | Mayer |
| 5,738,548 A | 4/1998 | Rutulante |

(56) References Cited

U.S. PATENT DOCUMENTS

| | | |
|---|---|---|
| 5,756,972 A | 5/1998 | Vranicar et al. |
| 5,762,510 A | 6/1998 | Taniguchi et al. |
| 5,763,826 A | 6/1998 | Castellani et al. |
| 5,787,183 A | 7/1998 | Chu et al. |
| 5,813,873 A | 9/1998 | McBain et al. |
| 5,836,789 A | 11/1998 | Kourimsky et al. |
| 5,907,653 A | 5/1999 | Burek et al. |
| 5,925,849 A | 7/1999 | Chen |
| 5,939,674 A | 8/1999 | Jibe et al. |
| 5,957,714 A | 9/1999 | Johnson |
| 5,967,818 A | 10/1999 | Carron et al. |
| 5,980,316 A | 11/1999 | Shinchi |
| 6,042,426 A | 3/2000 | Byrne |
| D426,520 S | 6/2000 | Goins |
| 6,077,109 A | 6/2000 | Prazoff |
| 6,102,229 A | 8/2000 | Moncourtois |
| 6,113,054 A | 9/2000 | Ma |
| 6,113,434 A | 9/2000 | Pate |
| 6,114,623 A | 9/2000 | Bonilla et al. |
| 6,129,443 A | 10/2000 | Murata et al. |
| 6,142,805 A | 11/2000 | Gray et al. |
| 6,142,825 A | 11/2000 | Shinchi |
| 6,186,814 B1 | 2/2001 | Matsushita |
| 6,220,897 B1 | 4/2001 | Maxwell |
| 6,227,395 B1 | 5/2001 | Ho |
| 6,241,554 B1 | 6/2001 | Murakami |
| 6,250,489 B1 | 6/2001 | Littrell et al. |
| D444,770 S | 7/2001 | Tong et al. |
| D445,091 S | 7/2001 | Tong et al. |
| 6,265,670 B1 | 7/2001 | Duesterhoeft et al. |
| 6,273,578 B1 | 8/2001 | Lai |
| D448,730 S | 10/2001 | Lee |
| 6,302,734 B1 | 10/2001 | Ichio et al. |
| 6,329,593 B1 | 12/2001 | Yang |
| 6,329,598 B1 | 12/2001 | M'Sadoques et al. |
| 6,343,952 B1 | 2/2002 | Fukuda |
| 6,344,612 B1 | 2/2002 | Kuwahara et al. |
| 6,364,678 B1 | 4/2002 | Hellwig et al. |
| 6,421,448 B1 | 7/2002 | Arndt et al. |
| 6,430,295 B1 | 8/2002 | Handel et al. |
| 6,443,766 B2 | 9/2002 | Ichio et al. |
| 6,446,930 B1 | 9/2002 | Li |
| 6,454,609 B1 | 9/2002 | Huang |
| 6,467,942 B2 | 10/2002 | Alloway et al. |
| 6,483,028 B2 | 11/2002 | DeBartolo, Jr. et al. |
| 6,492,590 B1 | 12/2002 | Cheng |
| D470,460 S | 2/2003 | Yu |
| 6,521,836 B1 | 2/2003 | Simonazzi |
| 6,529,869 B1 | 3/2003 | Wietzke et al. |
| 6,530,806 B2 | 3/2003 | Nelson |
| 6,545,215 B2 | 4/2003 | Young et al. |
| 6,552,262 B2 | 4/2003 | English et al. |
| 6,582,249 B1 | 6/2003 | Boeck et al. |
| 6,588,717 B2 | 7/2003 | Carnahan et al. |
| D481,009 S | 10/2003 | Stekelenburg |
| 6,637,161 B1 | 10/2003 | Buchalter et al. |
| D482,326 S | 11/2003 | Stekelenburg |
| 6,644,986 B1 | 11/2003 | Wilker, Sr. |
| 6,668,110 B2 | 12/2003 | Wu et al. |
| 6,699,078 B2 | 3/2004 | Quadir |
| 6,717,053 B2 | 4/2004 | Rupert |
| 6,719,584 B1 | 4/2004 | Favro et al. |
| 6,750,395 B2 | 6/2004 | Stout et al. |
| 6,757,394 B2 | 6/2004 | Matsuo |
| 6,790,084 B1 | 9/2004 | Osborn, Jr. et al. |
| 6,797,885 B2 | 9/2004 | Magyar et al. |
| 6,805,567 B2 | 10/2004 | Chapman |
| 6,805,581 B2 | 10/2004 | Love |
| 6,843,669 B2 | 1/2005 | Drane |
| 6,844,493 B2 | 1/2005 | Strong |
| 6,848,226 B1 | 2/2005 | Boyd |
| 6,854,226 B2 | 2/2005 | Cole et al. |
| 6,867,373 B2 | 3/2005 | West |
| 6,869,058 B2 | 3/2005 | Fung |
| 6,875,051 B2 | 4/2005 | Pizak |
| 6,902,415 B2 | 6/2005 | Ramsey |
| 6,902,438 B2 | 6/2005 | Tsuyama |
| 6,912,178 B2 | 6/2005 | Chu et al. |
| 6,931,794 B1 | 8/2005 | Burgess |
| 6,958,918 B2 | 10/2005 | Schroder et al. |
| 6,969,279 B1 | 11/2005 | Mahoney |
| 6,988,676 B2 | 1/2006 | Tronolone et al. |
| 6,994,578 B1 | 2/2006 | Chen |
| 7,004,786 B1 | 2/2006 | Bloom et al. |
| 7,014,478 B2 | 3/2006 | Yamashita et al. |
| 7,035,416 B2 | 4/2006 | Matsuo |
| D521,452 S | 5/2006 | Mori et al. |
| 7,075,010 B2 | 7/2006 | Santelli, Jr. |
| 7,099,155 B2 | 8/2006 | Kobayashi et al. |
| D528,076 S | 9/2006 | Tan |
| D528,508 S | 9/2006 | Tan et al. |
| 7,122,743 B2 | 10/2006 | Babiarz et al. |
| 7,137,823 B2 | 11/2006 | Naganishi |
| 7,140,897 B2 | 11/2006 | Axenbock et al. |
| 7,150,638 B1 | 12/2006 | Fonville et al. |
| D534,869 S | 1/2007 | Stekelenburg |
| 7,158,716 B2 | 1/2007 | Shapiro et al. |
| 7,186,929 B2 | 3/2007 | Cox et al. |
| 7,188,821 B2 | 3/2007 | Curtis |
| 7,192,289 B2 | 3/2007 | Kowalski |
| 7,203,323 B2 | 4/2007 | Tashev |
| 7,211,727 B2 | 5/2007 | Pearse et al. |
| 7,223,126 B2 | 5/2007 | Ng |
| 7,254,241 B2 | 8/2007 | Rui et al. |
| 7,255,596 B2 | 8/2007 | Pyrros |
| D555,268 S | 11/2007 | Stekelenburg |
| 7,313,243 B2 | 12/2007 | Hsu |
| 7,319,193 B2 | 1/2008 | Halterman |
| 7,341,463 B2 | 3/2008 | Lai |
| 7,347,712 B2 | 3/2008 | O'Connell et al. |
| 7,347,724 B2 | 3/2008 | Crupi |
| 7,355,130 B2 | 4/2008 | Holman et al. |
| 7,358,625 B2 | 4/2008 | Cheng et al. |
| D568,603 S | 5/2008 | Smith et al. |
| 7,441,924 B1 | 10/2008 | Thames et al. |
| 7,445,490 B2 | 11/2008 | Jacobson |
| 7,460,677 B1 | 12/2008 | Soede et al. |
| 7,470,133 B2 | 12/2008 | Khemakhem et al. |
| 7,491,099 B2 | 2/2009 | Zinell et al. |
| 7,510,446 B1 | 3/2009 | Yu et al. |
| 7,561,701 B2 | 7/2009 | Fischer |
| 7,568,666 B2 | 8/2009 | Kennedy |
| 7,575,470 B2 | 8/2009 | Pyrros |
| 7,579,549 B2 | 8/2009 | Jolly |
| 7,591,677 B2 | 9/2009 | Bade et al. |
| 7,597,580 B1 | 10/2009 | Advey et al. |
| 7,614,896 B2 | 11/2009 | Johnson et al. |
| 7,628,643 B2 | 12/2009 | Pyrros |
| 7,630,503 B2 | 12/2009 | Schulz et al. |
| 7,632,148 B1 | 12/2009 | Kawamura et al. |
| 7,633,008 B2 | 12/2009 | Kanou |
| 7,635,110 B2 | 12/2009 | Galasso et al. |
| 7,655,859 B2 | 2/2010 | Naß et al. |
| 7,658,612 B2 | 2/2010 | Lee et al. |
| 7,660,428 B2 | 2/2010 | Rodman et al. |
| 7,700,874 B2 | 4/2010 | Maloney et al. |
| 7,728,224 B2 | 6/2010 | Maloney et al. |
| 7,764,801 B2 | 7/2010 | Soede et al. |
| 7,783,061 B2 | 8/2010 | Zalewski et al. |
| 7,787,328 B2 | 8/2010 | Chu et al. |
| 7,795,544 B2 | 9/2010 | Peck |
| 7,817,805 B1 | 10/2010 | Griffin |
| 7,825,335 B2 * | 11/2010 | Carbone .................. H02G 3/18 439/535 |
| 7,841,876 B2 | 11/2010 | Lin et al. |
| 7,878,845 B2 | 2/2011 | Byrne |
| 7,889,873 B2 | 2/2011 | Sorensen |
| 7,893,567 B1 | 2/2011 | Deros et al. |
| 7,922,535 B1 | 4/2011 | Jiang et al. |
| 7,934,932 B1 | 5/2011 | Lee et al. |
| 7,943,850 B2 | 5/2011 | Leopold et al. |
| 7,955,097 B2 | 6/2011 | O'Leary et al. |
| 7,970,152 B2 | 6/2011 | Fischer et al. |
| D641,435 S | 7/2011 | Coote |

(56) References Cited

U.S. PATENT DOCUMENTS

| | | |
|---|---|---|
| 7,975,624 B2 | 7/2011 | Henriott |
| D644,180 S | 8/2011 | Lee et al. |
| 7,989,711 B2 | 8/2011 | Jolly |
| 7,991,168 B2 | 8/2011 | Wu et al. |
| 8,001,643 B1 | 8/2011 | James |
| 8,043,105 B2 | 10/2011 | Schmidt et al. |
| 8,052,437 B2 | 11/2011 | Jiang et al. |
| 8,063,317 B2 | 11/2011 | Bowman |
| 8,071,877 B2 | 12/2011 | Nakayama et al. |
| 8,098,842 B2 | 1/2012 | Florencio et al. |
| 8,113,853 B2 | 2/2012 | Coyle, Jr. et al. |
| 8,150,065 B2 | 4/2012 | Solbach et al. |
| 8,152,543 B1 | 4/2012 | Schutte |
| 8,154,588 B2 | 4/2012 | Burns et al. |
| 8,159,085 B2 | 4/2012 | Fleisig |
| 8,174,379 B2 | 5/2012 | Black |
| 8,218,787 B2 | 7/2012 | Kushida |
| 8,219,387 B2 | 7/2012 | Cutler et al. |
| 8,226,444 B2 | 7/2012 | Chow |
| 8,233,353 B2 | 7/2012 | Zhang et al. |
| 8,238,573 B2 | 8/2012 | Ishibashi et al. |
| 8,243,952 B2 | 8/2012 | Thormundsson et al. |
| 8,273,998 B2 * | 9/2012 | Drane .................. H02G 3/185 |
| | | 52/220.8 |
| 8,357,852 B2 | 1/2013 | Drane |
| 8,376,759 B2 | 2/2013 | Debock et al. |
| 8,398,042 B2 | 3/2013 | Hardy et al. |
| 8,425,256 B2 | 4/2013 | Aoki et al. |
| 8,454,372 B2 | 6/2013 | Lee et al. |
| 8,462,976 B2 | 6/2013 | Tamaru |
| 8,469,726 B2 | 6/2013 | Perales Fayos |
| 8,480,415 B2 | 7/2013 | Byrne |
| 8,526,633 B2 | 9/2013 | Ukai et al. |
| 8,529,277 B2 | 9/2013 | Williams et al. |
| D691,953 S | 10/2013 | Chayer |
| 8,545,239 B1 | 10/2013 | Oyster et al. |
| 8,559,611 B2 | 10/2013 | Ratmanski et al. |
| D692,831 S | 11/2013 | Beldock et al. |
| D693,307 S | 11/2013 | Beldock et al. |
| D693,308 S | 11/2013 | Beldock et al. |
| 8,622,759 B2 | 1/2014 | O'Connell et al. |
| D699,202 S | 2/2014 | Rose |
| 8,647,150 B2 | 2/2014 | Fujiwara et al. |
| 8,668,503 B2 | 3/2014 | Williams et al. |
| 3,704,091 A1 | 4/2014 | Shotey et al. |
| 8,716,607 B2 | 5/2014 | Chang |
| 8,723,055 B2 | 5/2014 | Beldock et al. |
| 8,740,627 B1 | 6/2014 | Rosenblum |
| 9,002,019 B2 | 4/2015 | Ise |
| 9,124,044 B2 | 9/2015 | Beldock et al. |
| 9,129,223 B1 | 9/2015 | Velusamy et al. |
| 9,433,282 B2 | 9/2016 | Steelman et al. |
| 9,610,399 B2 | 4/2017 | Gomez |
| 9,685,730 B2 * | 6/2017 | Jones .................. H02G 3/185 |
| 9,905,627 B2 | 2/2018 | Seol |
| 10,034,539 B2 | 7/2018 | Steelman et al. |
| 2001/0044233 A1 | 11/2001 | Moore, Jr. et al. |
| 2002/0108771 A1 | 8/2002 | Fu-Chung |
| 2002/0127918 A1 | 9/2002 | Kajiwara et al. |
| 2003/0015332 A1 | 1/2003 | Hassam et al. |
| 2003/0160862 A1 | 8/2003 | Charlier et al. |
| 2004/0108439 A1 | 6/2004 | Ma |
| 2004/0129445 A1 | 7/2004 | Winkelbach |
| 2005/0101192 A1 | 5/2005 | Foskey |
| 2005/0102935 A1 | 5/2005 | Picard |
| 2006/0013416 A1 | 1/2006 | Truong et al. |
| 2006/0141855 A1 | 6/2006 | Bloom et al. |
| 2007/0008760 A1 | 4/2007 | Hayes |
| 2007/0212918 A1 | 9/2007 | Gruebel et al. |
| 2007/0269071 A1 | 11/2007 | Hooley |
| 2008/0031935 A1 | 2/2008 | Bodenteich et al. |
| 2008/0188117 A1 | 8/2008 | Kuo |
| 2008/0267378 A1 | 10/2008 | Janse et al. |
| 2009/0090537 A1 | 4/2009 | Nunes |
| 2009/0130879 A1 | 5/2009 | Johnson |
| 2010/0013004 A1 | 1/2010 | Wu et al. |
| 2010/0026029 A1 | 2/2010 | Easling |
| 2010/0130042 A1 | 5/2010 | Gray |
| 2010/0190369 A1 | 7/2010 | Byrne |
| 2011/0147076 A1 | 6/2011 | Chen et al. |
| 2011/0171852 A1 | 7/2011 | Henry |
| 2011/0197794 A1 | 8/2011 | Nunes |
| 2012/0088400 A1 | 4/2012 | Pyrros |
| 2012/0138831 A1 | 6/2012 | Ridolfi et al. |
| 2012/0142206 A1 | 6/2012 | Buehman et al. |
| 2012/0170293 A1 | 7/2012 | Terry |
| 2012/0178270 A1 | 7/2012 | McElroy et al. |
| 2012/0190025 A1 | 7/2012 | Blackwood et al. |
| 2012/0190225 A1 | 7/2012 | Bessyo et al. |
| 2013/0021721 A1 | 1/2013 | Borden et al. |
| 2013/0029684 A1 | 1/2013 | Kawaguchi et al. |
| 2013/0039504 A1 | 2/2013 | Pandey et al. |
| 2013/0043055 A1 | 2/2013 | Ma et al. |
| 2013/0051577 A1 | 2/2013 | Morcelli et al. |
| 2013/0083911 A1 | 4/2013 | Bathurst et al. |
| 2013/0130525 A1 | 5/2013 | Hachadorian |
| 2013/0142355 A1 | 6/2013 | Isaac et al. |
| 2013/0142356 A1 | 6/2013 | Isaac et al. |
| 2013/0260582 A1 | 10/2013 | White |
| 2014/0034845 A1 | 2/2014 | Parker |
| 2014/0038458 A1 | 2/2014 | Bausch et al. |
| 2014/0094056 A1 | 4/2014 | Pyrros |
| 2014/0118891 A1 | 5/2014 | Crane et al. |
| 2014/0127948 A1 | 5/2014 | Beldock et al. |
| 2014/0174781 A1 | 6/2014 | Do |

FOREIGN PATENT DOCUMENTS

| | | |
|---|---|---|
| DE | 3900021 A1 | 11/2002 |
| DE | 10037179 A1 | 11/2002 |
| DE | 102010051581 A1 | 5/2012 |
| EP | 0582945 A2 | 2/1994 |
| JP | 2008031935 A | 2/2008 |
| WO | 2006118568 A2 | 11/2006 |
| WO | 2007008176 A1 | 1/2007 |
| WO | 2009104162 A1 | 8/2009 |
| WO | 2010103272 A1 | 9/2010 |

* cited by examiner

FLOOR POWER DISTRIBUTION SYSTEM

CROSS-REFERENCE TO RELATED APPLICATIONS

This patent application is a continuation of U.S. patent application Ser. No. 16/687,031, which was filed on Nov. 18, 2019, entitled "FLOOR POWER DISTRIBUTION SYSTEM," now U.S. Pat. No. 11,063,411, which is a continuation of U.S. patent application Ser. No. 16/403,017, which was filed on May 3, 2019, entitled "FLOOR POWER DISTRIBUTION SYSTEM," now U.S. Pat. No. 10,516,255, which is a continuation of U.S. patent application Ser. No. 16/028,485, which was filed on Jul. 6, 2018, entitled "FLOOR POWER DISTRIBUTION SYSTEM," now U.S. Pat. No. 10,333,284, which is a continuation of U.S. patent application Ser. No. 15/585,290, which was filed on May 3, 2017, entitled "FLOOR POWER DISTRIBUTION SYSTEM," now U.S. Pat. No. 10,050,424, which is a continuation of U.S. patent application Ser. No. 14/850,206, which was filed on Sep. 10, 2015, entitled "FLOOR POWER DISTRIBUTION SYSTEM," now, U.S. Pat. No. 9,685,730, which claims benefit to U.S. Provisional Application No. 62/049,483, which was filed on Sep. 12, 2014, entitled "FLOOR POWER DISTRIBUTION SYSTEM," and claims benefit to U.S. Provisional Patent Application No. 62/216,051, which was filed Sep. 9, 2015, entitled "FLOOR POWER DISTRIBUTION SYSTEM." The aforementioned related applications are hereby incorporated by reference in their entirety.

BACKGROUND OF THE DISCLOSURE

Current floor power distribution systems are often difficult to assemble and conceal. Such systems may also be susceptible to fluid intrusion. Further, these systems may present trip hazards or interfere with the use or positioning of floor equipment. Thus, there is a need for a floor power distribution system that overcomes these deficiencies.

SUMMARY OF THE DISCLOSURE

One aspect includes a connection arrangement for a floor power distribution system that includes a hub arrangement configured to distribute electrical power and including a hub housing and an electrical connector, the hub housing configured to abut a floor, and an adapter configured to engage the hub housing of the hub arrangement and configured to abut the floor, wherein at least a portion of the adapter is cantilevered over at least a portion of the hub housing, wherein the portion of the adapter that is cantilevered over the portion of the hub housing is vertically aligned with the electrical connector of the hub arrangement.

Another aspect may further or alternatively include a connection arrangement for a power distribution system that includes a hub arrangement including a hub housing and a first electrical connector, the hub housing configured to abut a floor, a door module coupled to the hub housing and movable between a closed position preventing access to the first electrical connector, and an open position allowing access to the first electrical connector, and a plug arrangement including a plug housing and a second electrical connector that is complementary to the first electrical connector, the plug housing including a first surface that abuts the hub housing and a planar second surface that is arranged at an acute angle from the first surface, wherein the door abuts and is substantially aligned with the second surface when in the open position.

Still another aspect may further or alternatively include a protective cap removably engaged to a pronged plug arrangement having a seal member that includes a body portion, a pair of downwardly extending bosses, a pair of opposing sidewalls, and a pair of guard walls extending across the body portion and adjoined to the sidewalls, wherein when the protective cap is in an engaged position: the bosses are snappedly engaged to openings in the plug arrangement, the body portion covers the prongs and the seal member, and the prongs are housed between the guard walls and the sidewalls.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary and may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the teachings of the present disclosure.

As used herein, the term "and/or," when used in a list of two or more items, means that any one of the listed items can be employed by itself, or any combination of two or more of the listed items can be employed. For example, if an apparatus is described as containing components A, B, and/or C, the composition can contain A alone; B alone; C alone; A and B in combination; A and C in combination; B and C in combination; or A, B, and C in combination.

Figure 1:
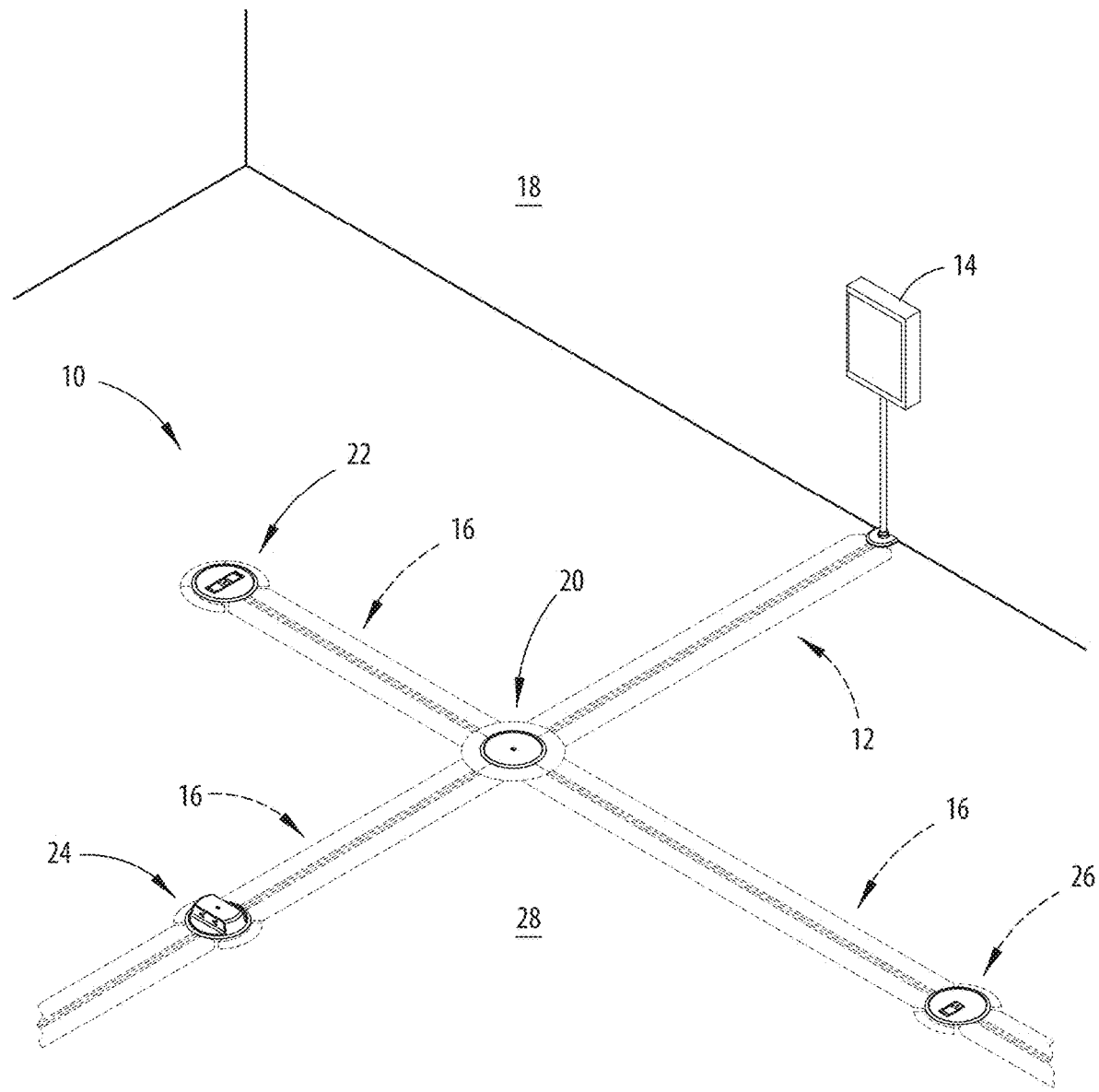
FIG. 1 is a perspective view of a floor power distribution system; according to one embodiment.

Referring to FIG. 1, a floor powered distribution system 10 is generally shown. The system 10 benefits from a modular and low profile design and may be implemented in commercial, educational and domestic applications. The system 10 includes a primary raceway 12 that may be in electrical communication with a power source 14. The primary raceway 12 may be configured to deliver standard electrical power from the power source 14 to one or more secondary raceways 16. The power source 14 may include a building power source, and is exemplarily shown as a conventional junction box coupled to a wall 18. In other embodiments, the power source 14 may be provided in other building structures such as a floor, ceiling, or other structure, or may be a standalone power source.

The secondary raceways 16 may be electrically coupled to the primary raceway 12 at a junction, which is exemplarily shown as a blank junction assembly 20. The secondary raceways 16 may each deliver electrical power received from the primary raceway 12 to corresponding junctions, which are exemplarily shown as a dual door junction assembly 22, a NEMA junction assembly 24, and a single-door junction assembly 26, respectively. Depending on the connection arrangement for a particular junction, the junction may enable electrical power to be delivered to one or more connected electrical devices and/or route electrical power to another junction(s) in the system 10. As an additional feature, portions of the system 10 represented by dotted lines may be placed beneath a floor covering 28 (e.g. carpet) so as not to interfere with foot traffic. Further, while a floor power distribution system 10 is provided herein, it should be appreciated that the various connection arrangements described below may be similarly implemented in power distribution systems that draw support from other surfaces such as, but not limited to, walls, ceilings, and the like, without departing from the teachings provided herein.

Figure 2:
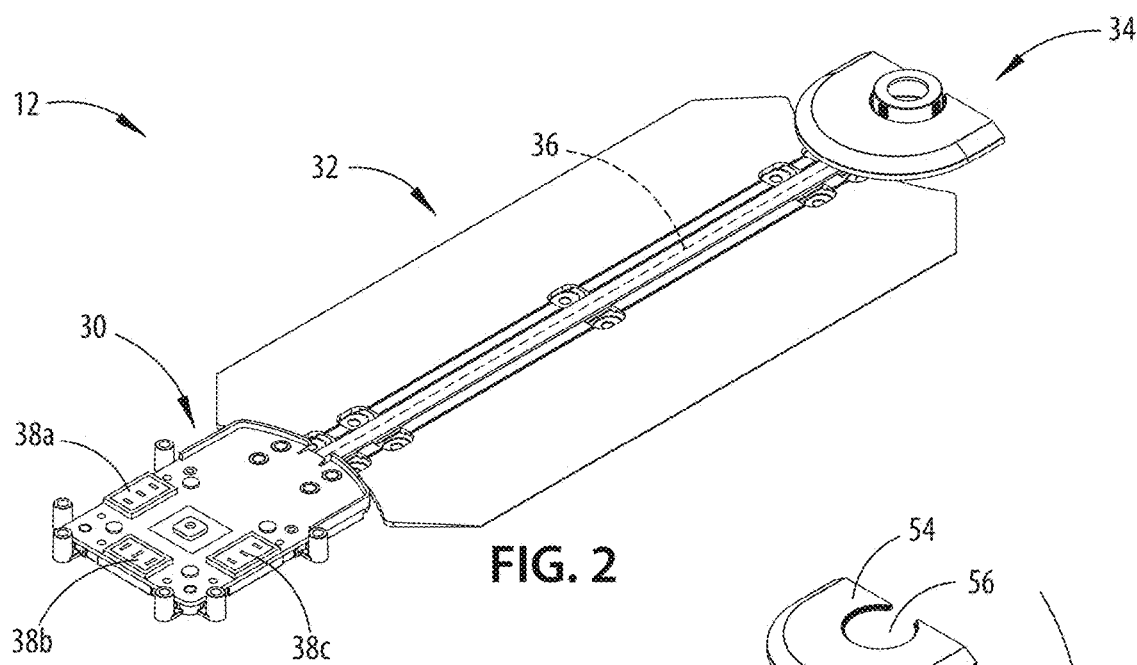
FIG. 2 illustrates a perspective view of a primary raceway of the floor distribution system.

Referring to FIG. 2, the primary raceway 12 of the system 10 is shown according to one embodiment. The primary raceway 12 may include a hub arrangement 30, a branch raceway 32, and a power in-feed assembly 34, each of which may be configured to abut a floor or other surface. Together, the hub arrangement 30, the branch raceway 32, and the power in-feed assembly 34 may cooperate to deliver standard electrical power from a power source (e.g. power source 14). Electrical power may be delivered via an electrical wire 36 that may be electrically coupled to the power source and extends through the power in-feed assembly 34 and the branch raceway 32. The electrical wire 36 may also be electrically coupled to the hub arrangement 32 and electrical power carried on the electrical wire 36 may be dispersed within the hub arrangement 30 and delivered to one or more adapters (not shown) coupled to the hub arrangement 32 at coupling areas 38a-38c to enable one or more electrical connections to be made with the hub arrangement 30.

Figure 3:
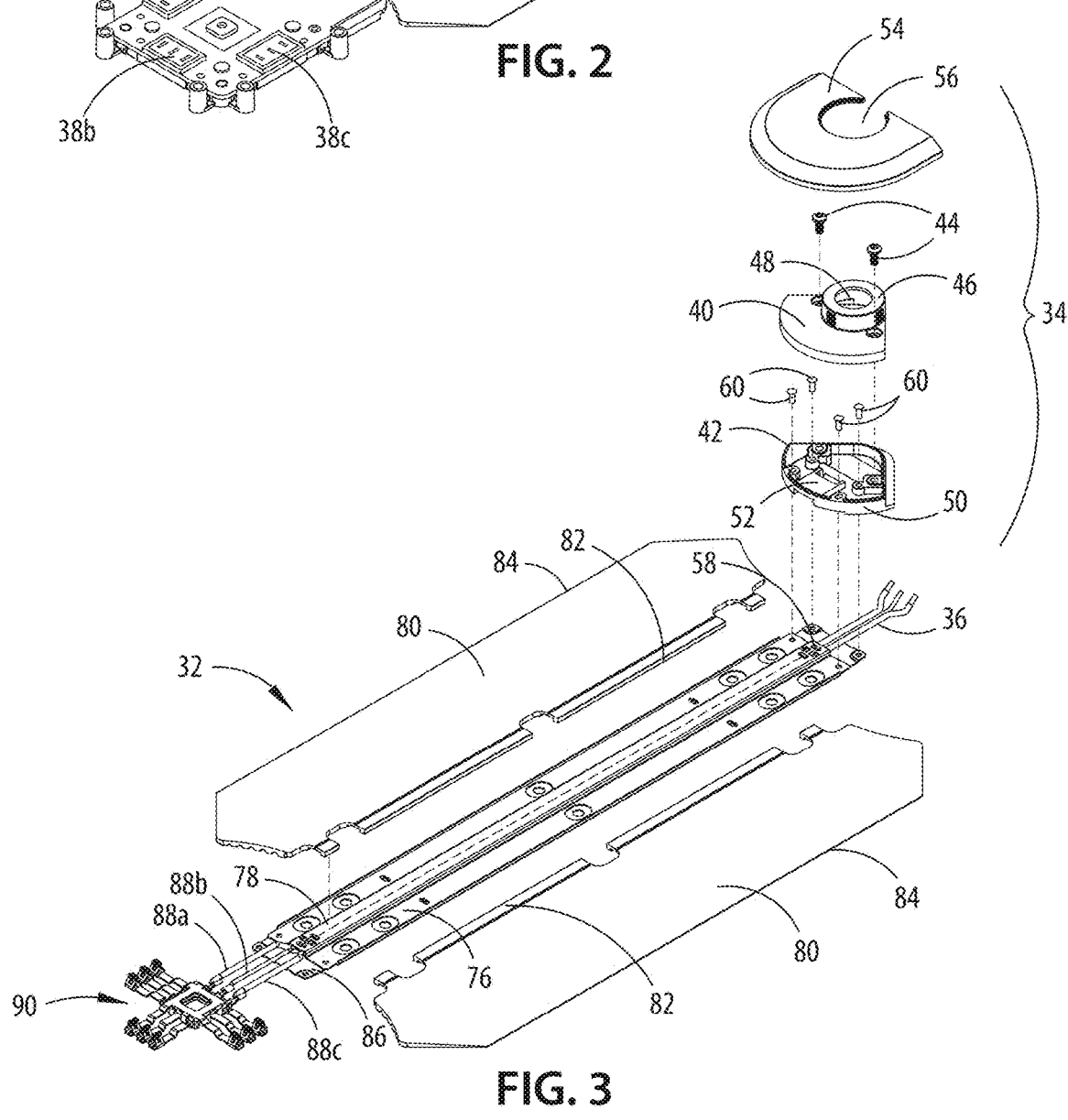
FIG. 3 is an exploded view of a branch raceway and a power in-feed assembly of the primary raceway.

Referring to FIG. 3, an exploded view of the power in-feed assembly 34 and the branch raceway 32 is shown according to one embodiment. Beginning from the right of the page, the power in-feed assembly 34 may include an upper housing member 40 and a lower housing member 42 connected to one another via one or more mechanical fasteners 44. The upper housing member 40 may include a raised neck portion 46 that has an opening 48 for allowing access to the electrical wire 36 so that a direct or indirect connection can be made with a power source. The lower housing member 42 may include a raised portion 50 having an opening 52 through which the electrical wire 36 is fed into the branch raceway 32. The power-feed assembly 34 may further include a cover 54 having a space 56 that is configured to receive the raised neck portion 46 of the upper housing member 40. The cover 54 may be secured to the upper housing member 40 and/or lower member 42 via a snap fit arrangement or other suitable means (e.g., mechanical fasteners) to accommodate various floor covering thicknesses.

Figure 4:
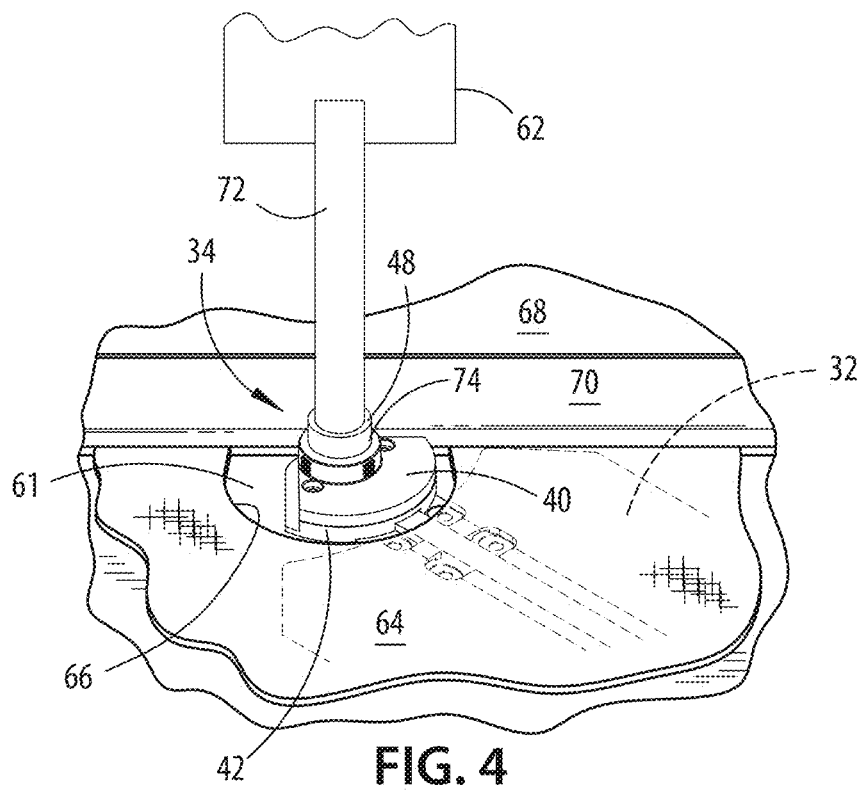
FIGS. 4 and 5 illustrate the assembly of the power in-feed assembly to a floor.
Figure 5:
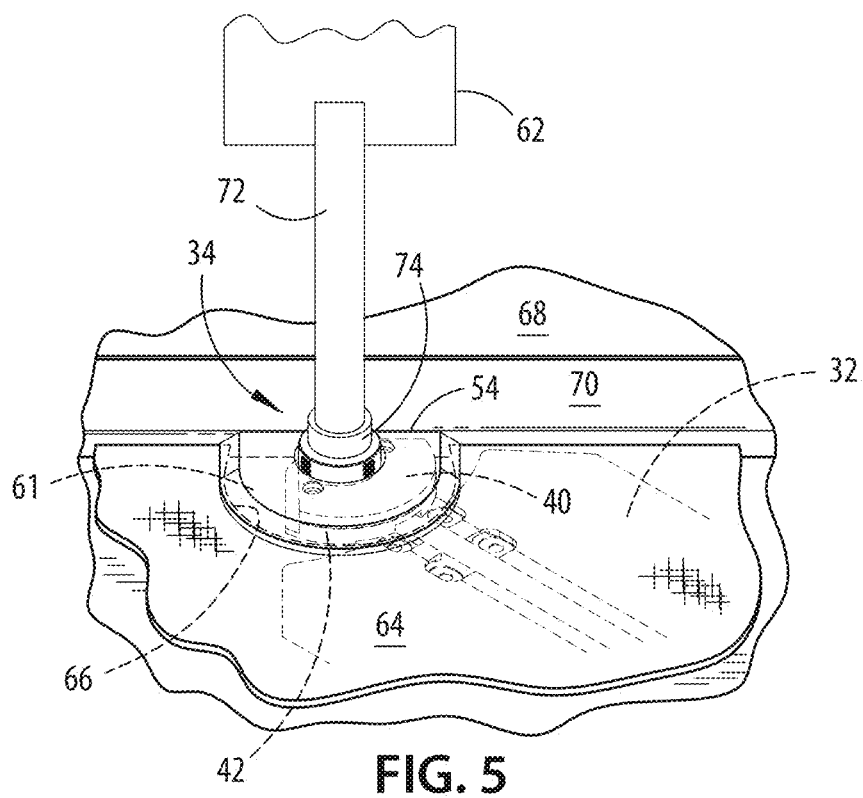

The assembled power in-feed assembly 34 may be coupled to the branch raceway 32 by adjoining the raised portion 50 to one end 58 of the branch raceway 32 via one or more mechanical fasteners 60. Once engaged, the underside of the branch raceway 32 and the underside of the power in-feed assembly 34 may be substantially coplanar with respect to each other, thereby enabling the power in-feed assembly 34 and the branch raceway 32 to be placed on a floor or other surface in a low profile configuration. As exemplarily shown in FIG. 4, the power in-feed assembly 34 and the branch raceway 32 may be positioned to abut a floor area 61 proximate a power source, exemplarily shown as a wall mounted junction box 62. The branch raceway 32 may be placed under a floor covering 64 and the assembled upper and lower housing members 40, 42 of the power in-feed assembly 34 may be located within a cut out portion 66 of the floor covering 64 and positioned to abut against a wall 68 or against a molding 70. A conduit 72 may be coupled to the junction box 62 and the opening 48 of the upper housing member 40 to enable the electrical wire 36 to make a direct or indirect electrical connection with the junction box 62. The conduit 72 may be secured to the upper housing member 40 via a removable locking member 74. As shown in FIG. 5, the cover 54 may be placed over the assembled upper and lower housing members 40, 42 to hide the cut out portion 66 and compress the floor covering 64. With respect to FIGS. 4 and 5, it should be understood that the power in-feed assembly 34 may be configured to enable the branch raceway 32 to extend in various directions relative to the wall 68. Furthermore, it should be understood that the power in-feed assembly 34 may be positioned behind the wall 68 in alternative embodiments.

Referring back to FIG. 3, the branch raceway 32 is exemplarily shown in a linear configuration and may be configured in other linear or non-linear configurations of variable length in other embodiments. The branch raceway 32 may have a hat shaped configuration including a base portion 76 and a raised conduit 78 that houses the electrical wire 36. The conduit 78 may be positioned centrally along the base portion 76 and may extend the length of the branch raceway 32. As an optional feature, the branch raceway 32 may include two ramps 80, each disposed on opposite sides of the conduit 78 and extending the length of the branch raceway 32 between the power in-feed assembly 34 and the hub arrangement 30. Each ramp 80 may have substantially the same height as the combined height of the base portion 76 and the conduit 78 of the branch raceway 32. Each ramp 80 may also be partially supported by the base portion 76 of the branch raceway 32 and configured such that its underside is substantially coplanar with the underside of the branch raceway 32 to enable the ramp 80 to abut a floor or other surface. Additionally, each ramp 80 may taper when moving from an end 82 proximate to the conduit 78 to an end 84 distal to the conduit 78. This enables the branch raceway 32 to be less apparent when placed underneath a floor covering. The ramps 80 may be secured to the base portion 76 of the branch raceway 32 via one or more mechanical fasteners (not shown). The electrical wire 36 may exit the conduit 78 at end 86 of the branch raceway 32 and be partitioned into separate wires, exemplarily shown as wires 88a, 88b, and 88c, which may correspond to hot, ground, and neutral, respectively. Wires 88a-88c may be electrically coupled to a bus bar assembly 90 that functions to disperse electrical power.

Figure 6:
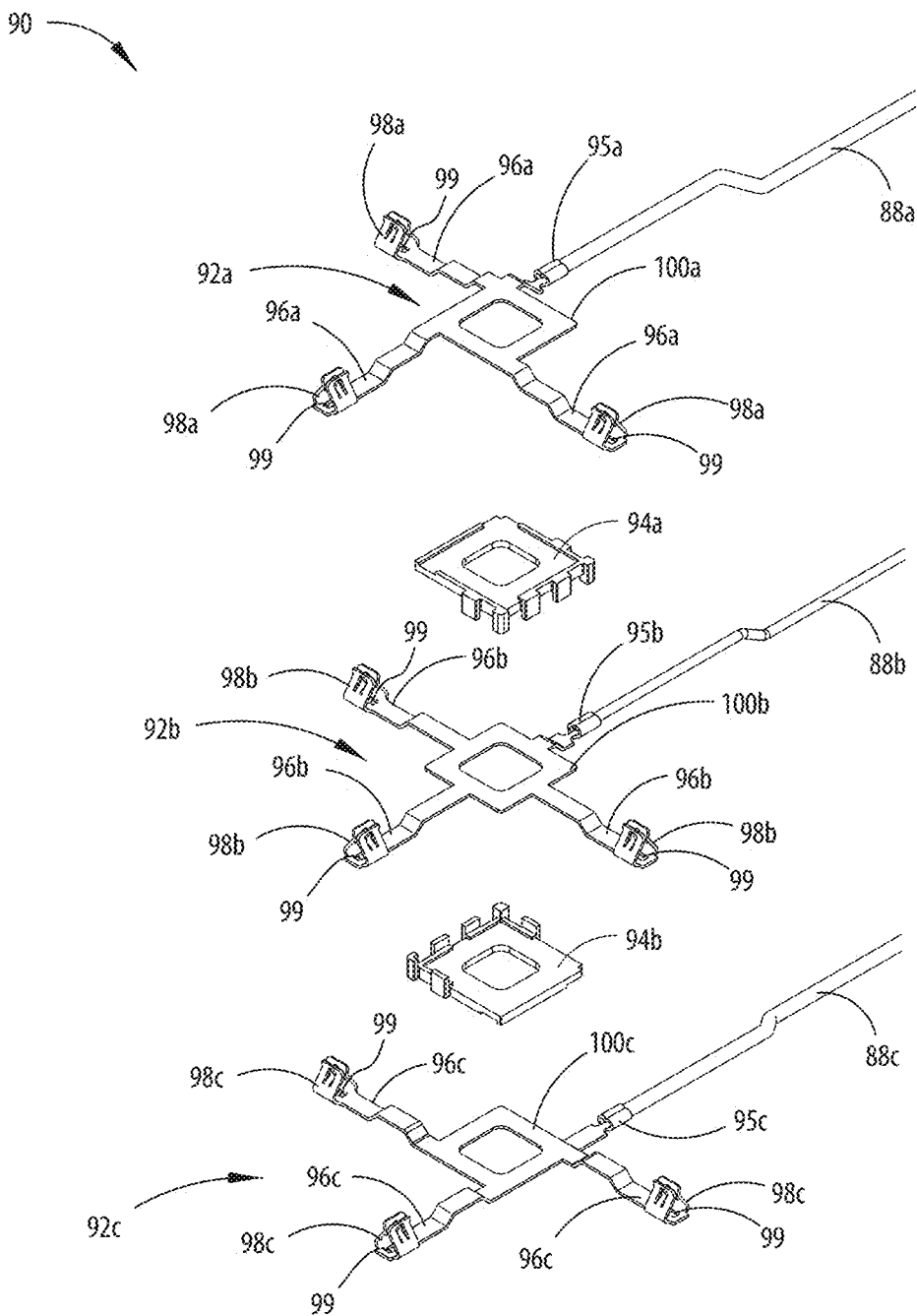
FIG. 6 is an exploded view of a bus bar assembly.

As best shown in FIG. 6, the bus bar assembly 90 may include a plurality of conductor plates, shown as conductor plates 92a-92c. The conductor plates 92a-92c may be arranged in a vertical stacked configuration, and the bus bar assembly 90 may also include insulator plates 94a and 94b that are interspaced between the conductor plates 92a-92c and may be snappedly or frictionally engaged to each other to help secure the conductor plates 92a-92c. According to one embodiment, each of the conductor plates 92a-92c may be electrically coupled to a uniquely associated wire 88a-88c via a crimping member 95a-95c. Each conductor plate 90a-90c may include arms 96a-96c that extend therefrom and each arm 96a-96c may include an electrical contact 98a-98c that is disposed distally from the corresponding conductor plate 92a-92c. Each contact 98a-98c may be configured to receive a prong from an adapter. A slot 99 may be provided below each electrical contact 98a-98c to allow the contacts 98a-98c to receive prongs having longer lengths. The conductor plates 92a-92c may have a square shaped body 100a-100c whereby each crimping member 95a-95c is provided on one side of the corresponding body 100a-100c and each arm 96a-96c extends sideways from one of the remaining sides of the corresponding body 100a-100c. In the presently illustrated embodiment, the arms 96a-96c of a given conductor plate 92a-92c extend sideways therefrom at 90 degrees, 180 degrees, and 270 degrees relative to the associated wire 88a-88c.

Figure 7:
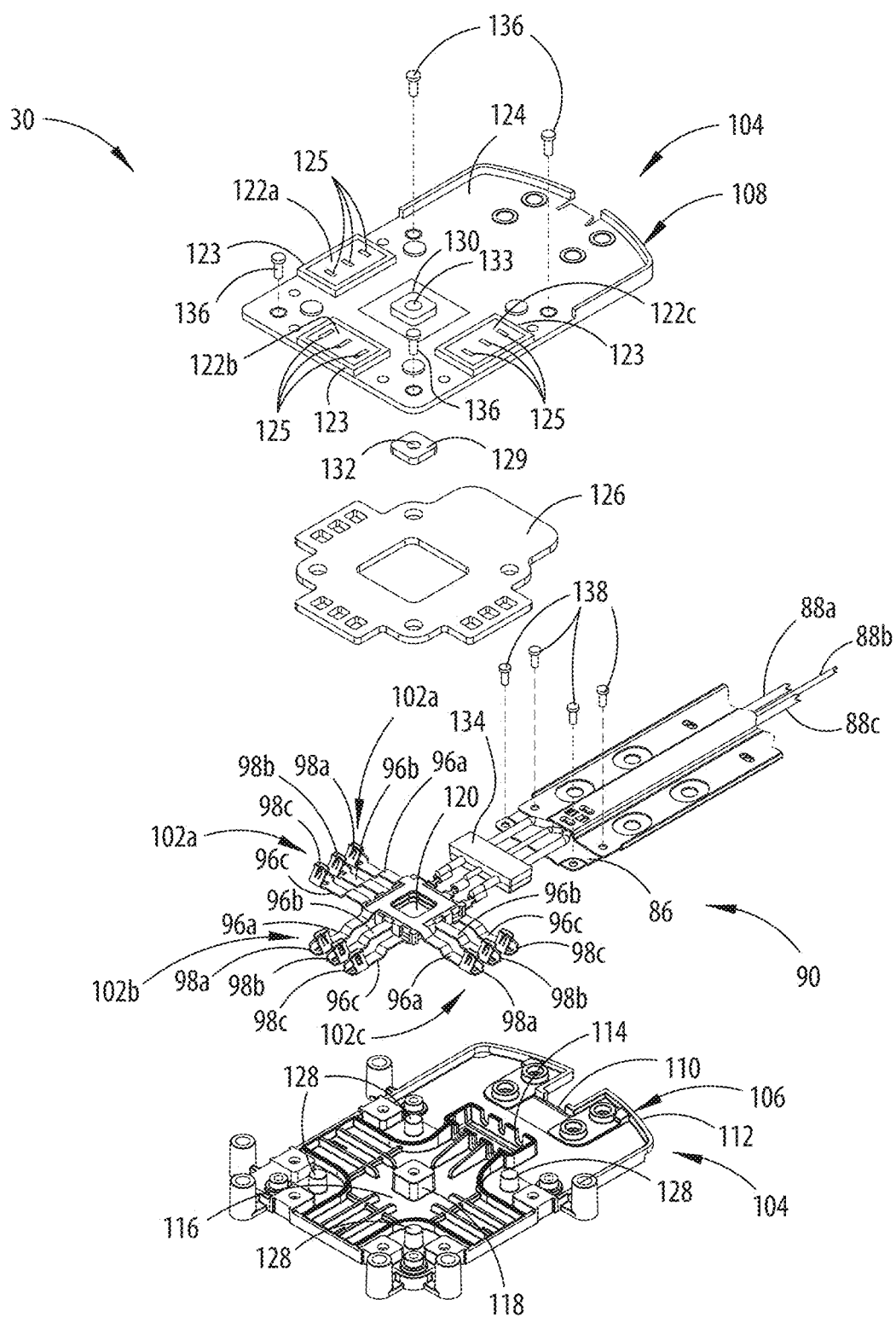
FIG. 7 is an exploded view of a hub arrangement.

As best shown in FIG. 7, the electrical contacts 98a-98c extending in like directions define a triad 102a-102c capable of making an electrical connection with a complementary plug (not shown). The arms 96a-96c associated with each triad 102a-102c may have the same length and may be positioned about the corresponding conductor plate 92a-92c such that the electrical contacts 98a-98c associated with each triad 102a-102c are horizontally aligned and equally spaced with one another. Alternatively, the arms 96a-96c associated with any given triad 102a-102c may be configured such that one or more of the corresponding electrical contacts 98a-98c are staggered and/or unevenly spaced with respect to the others. In alternative embodiments, the electrical contacts 98a-98c associated with any given triad 102a-102c may be configured in a plug arrangement that is configured to be received, or otherwise plug into a complementary adapter.

Figure 8:
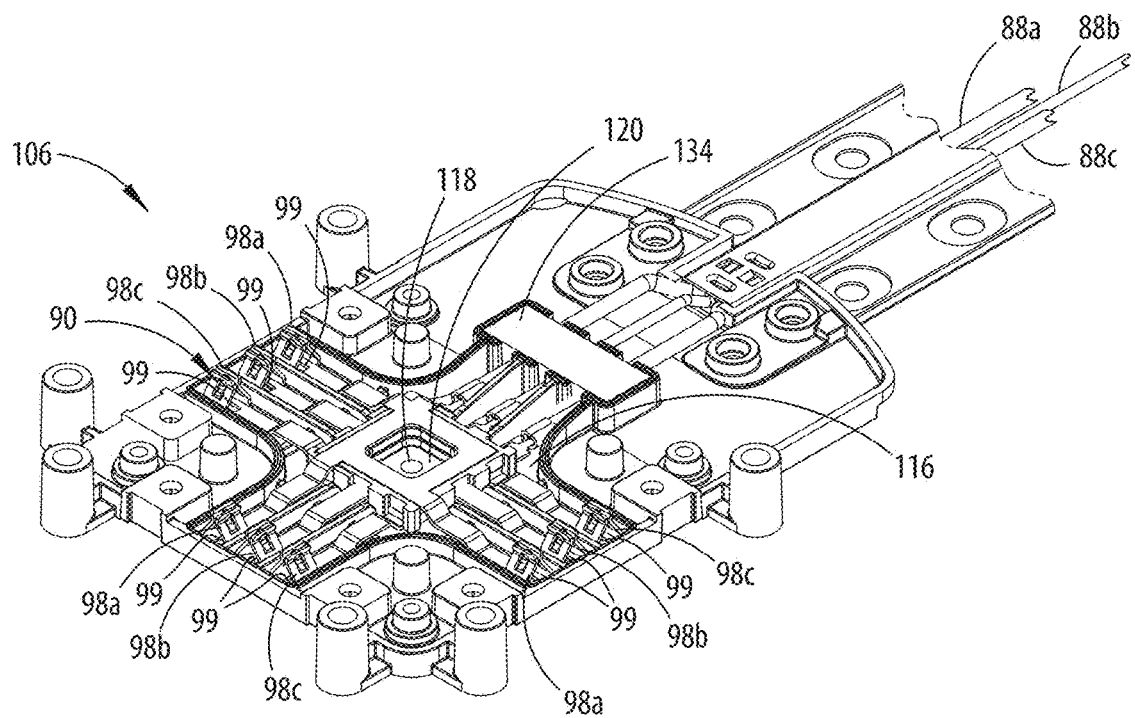
FIG. 8 illustrates a bus bar assembly secured by a hub housing.

The bus bar assembly 90 may be secured within the hub arrangement 30, which includes a hub housing defined by a lower housing member 106 and an upper housing member 108. The lower housing member 106 includes an entryway 110 on a raised portion 112 of the lower housing member 106 to allow the entry of wires 88a-88c into the hub arrangement 30. The wires 88a-88c may be secured to a slotted passageway 114 that leads to a recessed chamber 116 in which the bus bar assembly 90 may be received. A boss 118 may be centrally provided in the recessed chamber 116 and may be configured to receive the bus bar assembly 90 via a complementary space 120 spanning the vertical center of the bus bar assembly 90 (FIG. 8). Together, the recessed chamber 116 and the boss 118 may cooperate to prevent rotational movement of the bus bar assembly 90 such that each triad 102a-102c may be aligned with a uniquely associated electrical receptacle 122a-122c of the upper housing 108. Each electrical receptacle 122a-122c may be surrounded by a rib 123 extending vertically from an upwardly facing surface 124 of the upper housing member 108. Each electrical receptacle 122a-122c may include three equally spaced and dimensioned slots 125 that are vertically aligned with the electrical contacts 98a-98c of a corresponding triad 102a-102c to define an electrical connector of the hub arrangement 30. It should be appreciated that any electrical connectors described herein are not limited only to plug arrangements and/or receptacles arrangements. Rather, it should be understood that the configuration of any given electrical connector will necessarily be dictated by the configuration of a corresponding electrical connector with which the electrical connector makes an electrical connection, and vice versa. Thus, with respect to the disclosure provided herein, an electrical connector should be seen to include any electrical component capable of being electrically coupled with another in order to transfer electrical power therebetween.

As is further shown in FIG. 7, a housing gasket 126 may be tightly positioned between the bus bar assembly 90 and the upper housing member 108 of the hub arrangement 30. The housing gasket 126 may be configured to not obstruct access to the electrical contacts 98a-98c of the bus bar assembly 90 and may be engaged to a plurality of alignment pegs 128 of the lower housing member 106. A center seal 129 may be tightly positioned between the boss 118 and a recess 130 of the upper housing member 108. The center seal 129 and the recess 130 may each have an opening 132, 133, respectively, that is vertically aligned with the boss 118 to allow a mechanical fastener (not shown) to be received in the boss 118. The hub arrangement 30 may further include a sealing grommet 134 that is coupled to the wires 88a-88c and tightly positioned before the slotted passageway 114. Together, the housing gasket 126, the center seal 129, and the sealing grommet 134 define a sealing arrangement of the hub arrangement 30 and function to create a watertight seal between the lower housing member 106 and the upper housing member 108. Once the sealing arrangement and the bus bar assembly 90 are properly positioned, the upper housing member 108 may be secured to the lower housing member 106 via mechanical fasteners 136. Alternatively, the upper and lower housing members 108, 106 may be coupled to each other via vibration welding. In so doing, the housing gasket 126 may be omitted from the hub arrangement 30. Once the hub arrangement 30 is assembled, the branch raceway 32 may be coupled thereto by adjoining end 86 of the branch raceway 32 to the underside of the raised portion 112 of the lower housing member 106 via mechanical fasteners 138 such that the underside of the branch raceway 32 and the underside of the hub housing 104 are substantially coplanar with each other, allowing the hub arrangement 30 and the branch raceway 32 to be placed on a floor or other surface in a low profile configuration.

Figure 9:
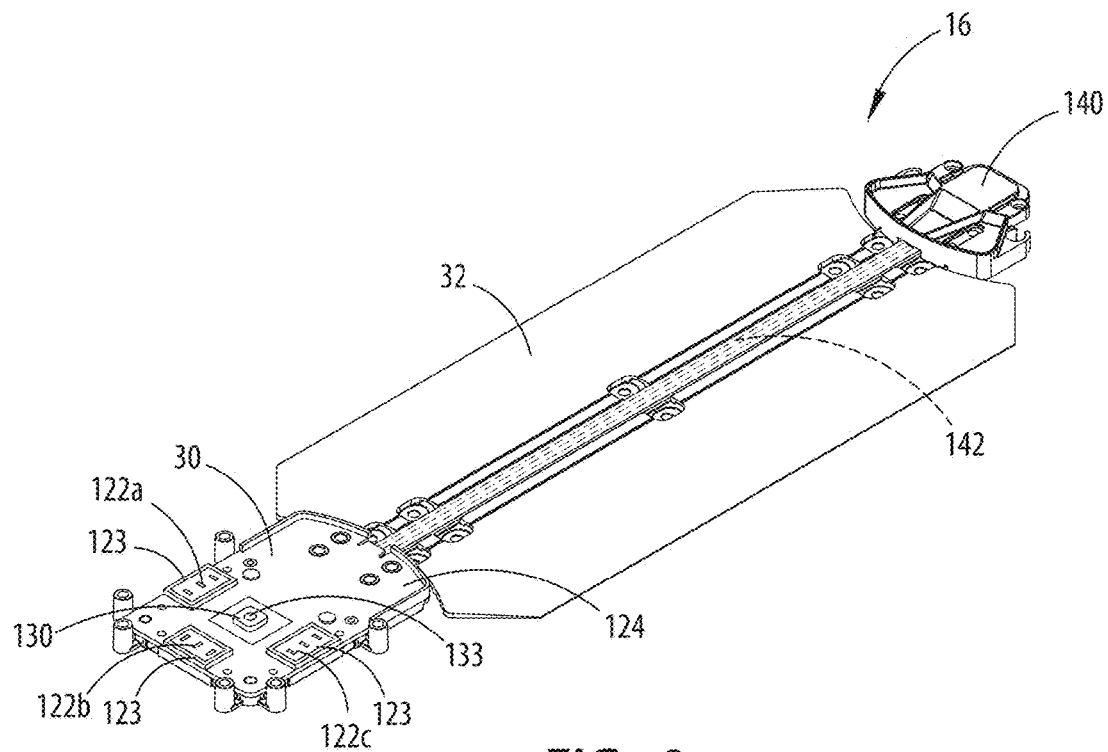
FIG. 9 illustrates a secondary raceway of the floor power distribution system.
Figure 10:
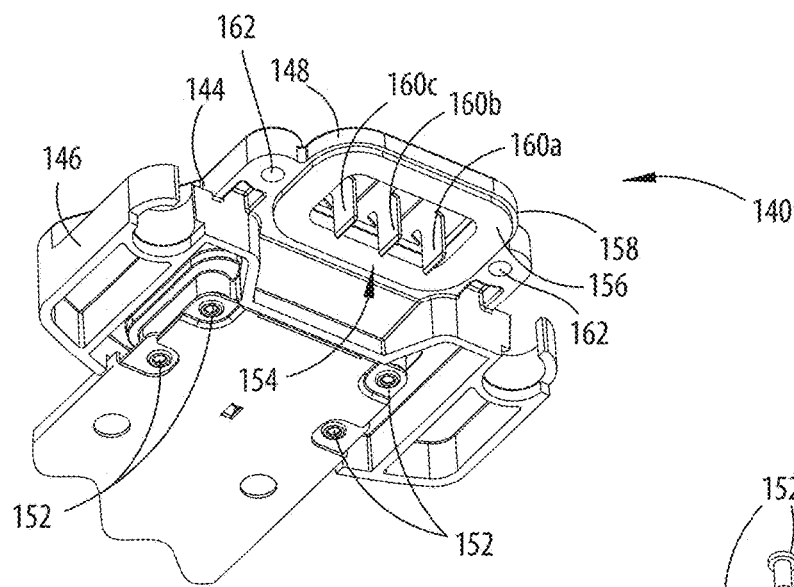
FIG. 10 is a bottom perspective view of an adapter.
Figure 11:
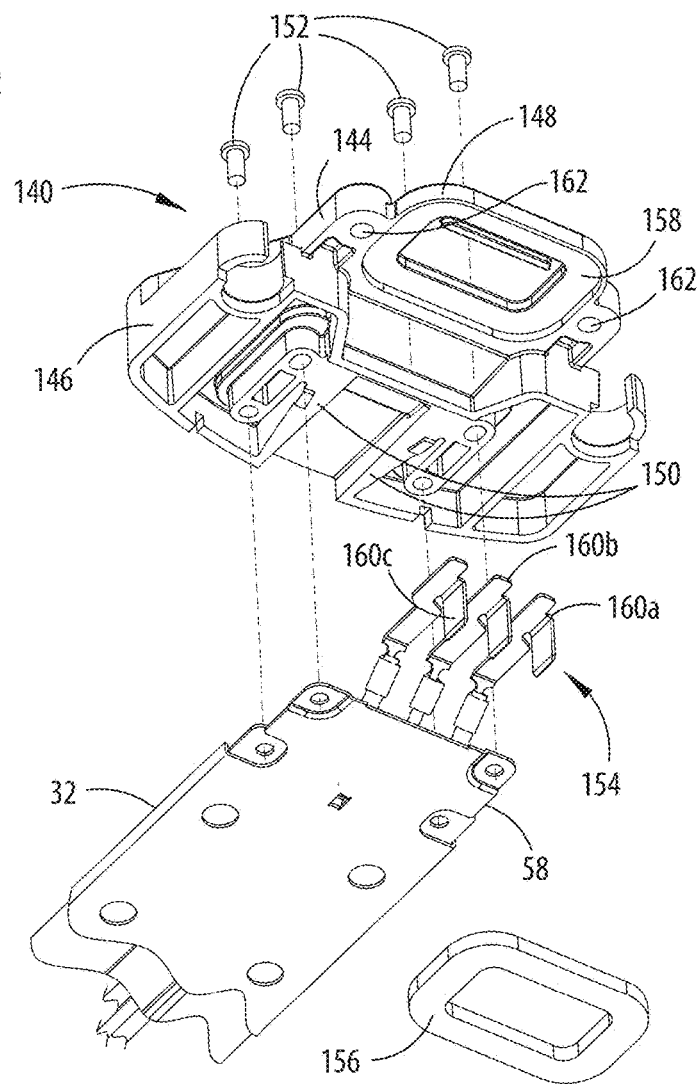
FIG. 11 is an exploded view of the adapter.

Referring to FIG. 9, the secondary raceway 16 is shown according to one embodiment. The secondary raceway 16 may be assembled with the hub arrangement 30 and the branch raceway 32 described previously herein with respect to the primary raceway 12. In place of the power in-feed assembly 34, the secondary raceway 16 may include a plug arrangement 140, which is a specialized adapter capable of being coupled to the branch raceway 32 and is electrically coupled to an electrical wire 142 that extends through the branch raceway 32 and makes an electrical connection with the bus bar assembly 90 located within the hub arrangement 30. As best shown in FIGS. 10 and 11, the plug arrangement 140 may include a plug housing 144 that has a lower portion 146 and a raised portion 148 that is cantilevered from the lower portion 146. The underside of the lower portion 146 may include a recess portion 150 which may be adjoined to end 58 of the branch raceway 32 via mechanical fasteners 152 such that the underside of the branch raceway 32 is substantially coplanar with the underside of the plug housing 144, thereby allowing the plug arrangement 140 to be placed on a floor or other surface in a low profile configuration with respect to the branch raceway 32.

The plug arrangement 140 may also include an electrical connector 154 surrounded by a seal member 156 that may be secured to a downwardly facing surface 158 of the raised portion 148. The seal member 156 may correspond to a foam water seal and may be contoured to the shape of the rib 123 surrounding the electrical receptacles 122a-122c of the hub arrangement 30. The electrical connector 154 may be positioned to extend from the underside of the raised portion 148 and may be configured to compliment an electrical connector (e.g. triad 102a-102c) of another secondary raceway 16 or a primary raceway 12. The electrical connector 154 may include prongs 160a-160c that may correspond to hot, ground, and neutral, respectively. The prongs 160a-160c may be equally dimensioned and spaced according to the slots of the electrical receptacles 122a-122c to allow an electrical connection to be made with the corresponding electrical contacts 98a-98c of the bus bar assembly 90.

Figure 12:
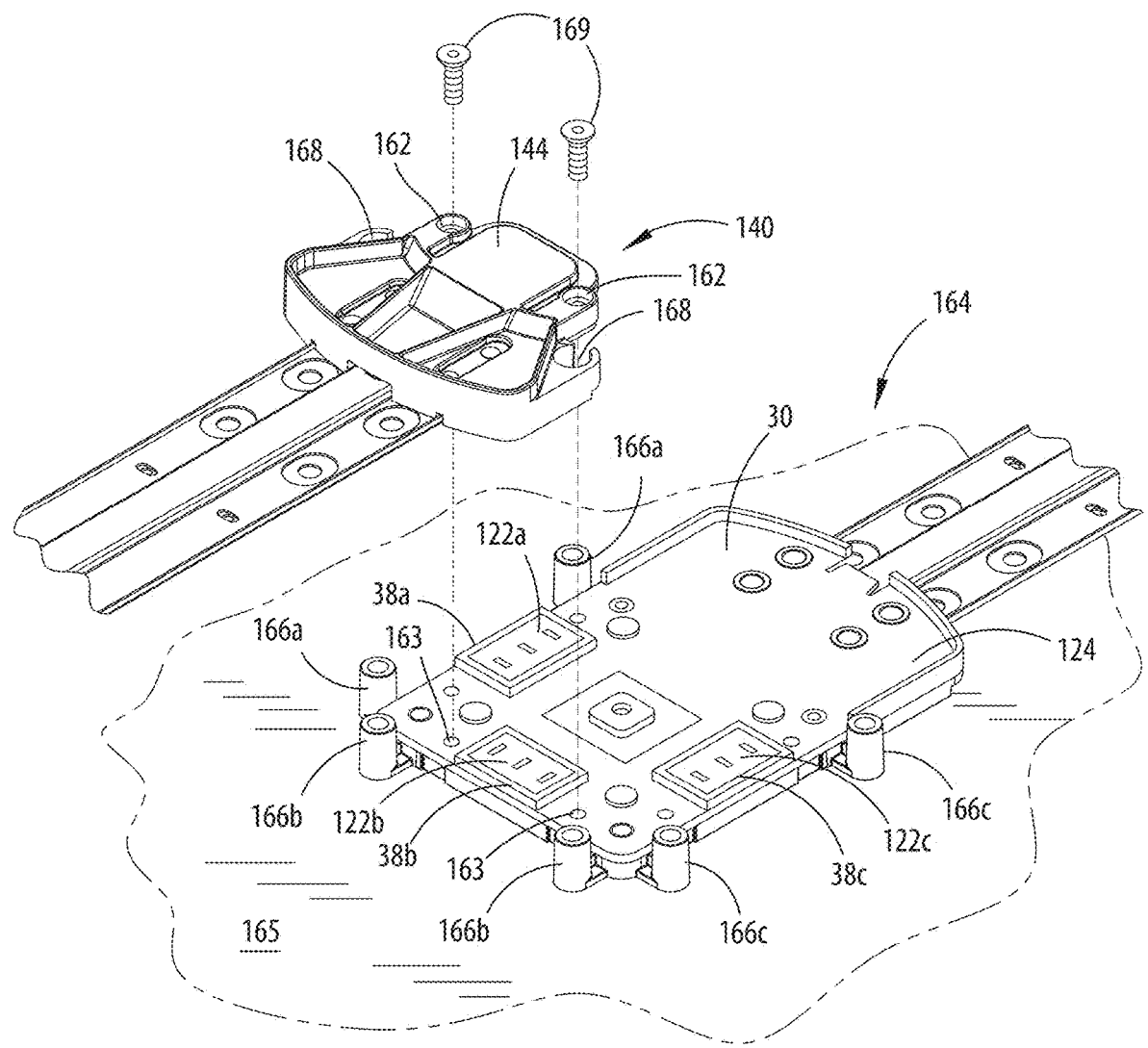
FIG. 12 illustrates the adapter being coupled to a secondary raceway.

As shown in FIG. 12, the plug arrangement 140 may be configured to make an electrical connection with the hub arrangement 30 of another raceway 164, which may abut a floor 165 and may be configured as a secondary raceway 16 or a primary raceway 12. In assembly, the prongs 160a-160c of the plug arrangement 140 may be inserted into the corresponding electrical receptacle 122b of the hub arrangement 30 by moving the plug arrangement 140 in a downward direction with respect to the hub arrangement 30. Preferably the prongs 160a-160c are inserted into the corresponding electrical receptacle 122b of the hub arrangement 30 by moving the plug arrangement 140 in a downward path at an acute angle with respect to the floor 165. More preferably, the prongs 160a-160c are inserted into the corresponding electrical receptacle 122b of the hub arrangement 30 by moving the plug arrangement 140 in a substantially vertical downward path with respect to the hub housing 104 of the hub arrangement 30, which will be described below in greater detail. As used herein, the term "downward" is defined as toward a lower place or level. Thus, the term "downward direction" should be understood to encompass any downward motion that is non-horizontal in nature. Further, it should be understood that any of the adapters described herein may be engaged to the hub arrangement 30 by moving the adapter in a downward direction with respect to the hub arrangement 30.

Regarding the presently illustrated embodiment, the plug arrangement 140 is positioned above a selected coupling area, exemplarily shown as coupling area 38b, such that the prongs 160a-160c of the plug arrangement 140 are vertically aligned with the corresponding electrical receptacle 122b. It should be understood that the selected coupling area may correspond to coupling areas 38a or 38c in other implementations. Due to the prongs 160a-160c extending downwardly from a cantilevered portion (e.g. raised portion 148) of the plug arrangement 140, the plug arrangement 140 is configured to only connect to the hub arrangement 30 in a single orientation to ensure a proper electrical connection between the plug arrangement 140 and the hub arrangement 30 of raceway 164. To aid in securing the plug arrangement 140, the hub arrangement 30 may include one or more sets of alignment stands 166a-166c disposed about the periphery of the hub arrangement 30. Each set of alignment stands 166a-166c may be assigned to a corresponding coupling area 38a-38c and may be received through complementary grooves 168 in the plug housing 144, thereby preventing rotational movement between the plug arrangement 140 and the hub arrangement 30.

When the plug arrangement 140 is properly oriented, the prongs 160a-160c may be inserted into the corresponding electrical receptacle 122b of the hub arrangement 30 by moving the plug arrangement 140 in a substantially vertical downward path with respect to the hub housing 104 of the hub arrangement 30. Once in place, a vertical downward force may be exerted on the plug housing 144, thereby causing the prongs 160a-160c to be fully received by the electrical contacts 98a-98c of the corresponding triad 102b such that an electrical connection is made between the plug arrangement 140 and the hub arrangement 30 of raceway 164. Furthermore, the vertical downward force compresses the seal member 156 to form a substantially watertight seal between the plug housing 144 and the hub arrangement 30. Once the prongs 160a-160c have been fully inserted, the lower portion 146 of the plug arrangement 140 abuts the floor 165 and the seal member 156 abuts and seals against the upwardly facing surface 124 of the hub arrangement 30 and the rib 123 of the electrical receptacle 122b. Additionally, the seal member 156 is positioned between the downwardly facing surface 158 of the plug housing 144 and the upwardly facing surface 124 of the hub arrangement 30. As a result, the prongs 160a-160c are substantially perpendicular to the floor 165 and the seal member 156 is substantially parallel to the floor 165. The plug arrangement 140 may be secured to the hub arrangement 30 via mechanical fasteners 169 to help ensure that the seal member 156 is fully compressed. In the presently illustrated embodiment, each of the mechanical fasteners 169 may be inserted through a corresponding opening 162 formed through the raised portion 148 of the plug housing 144 and fastened to a corresponding threaded member 163 that extends into the upwardly facing surface 124 of the hub arrangement 30.

Figure 13:
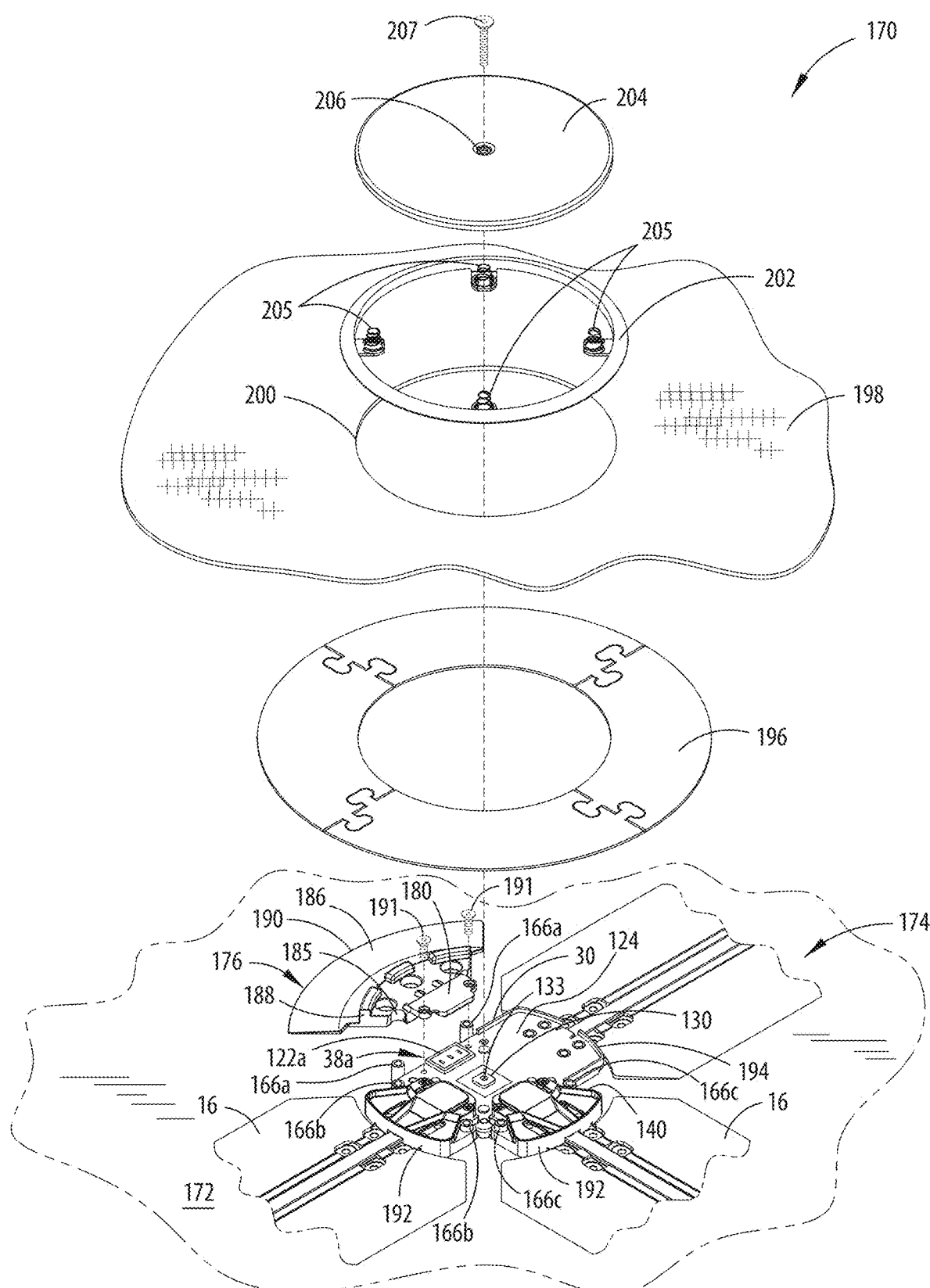
FIG. 13 illustrates a connection arrangement of a blank junction assembly.

Referring to FIG. 13, a connection arrangement for a blank junction assembly 170 is shown according to one embodiment. The blank junction assembly 170 generally functions to route electrical power in one or more directions along a floor 172 or other surface and is closed off from external connections. With respect to the illustrated embodiment, the connection arrangement includes raceway 174, which may be configured as a primary raceway 12 or a secondary raceway 16. The connection arrangement may include one or more secondary raceways 16 coupled to the hub arrangement 30 of raceway 174 to route electrical power in the corresponding floor direction towards additional junction assemblies (not shown), which may be configured according to any junction assembly described herein.

Figure 14:
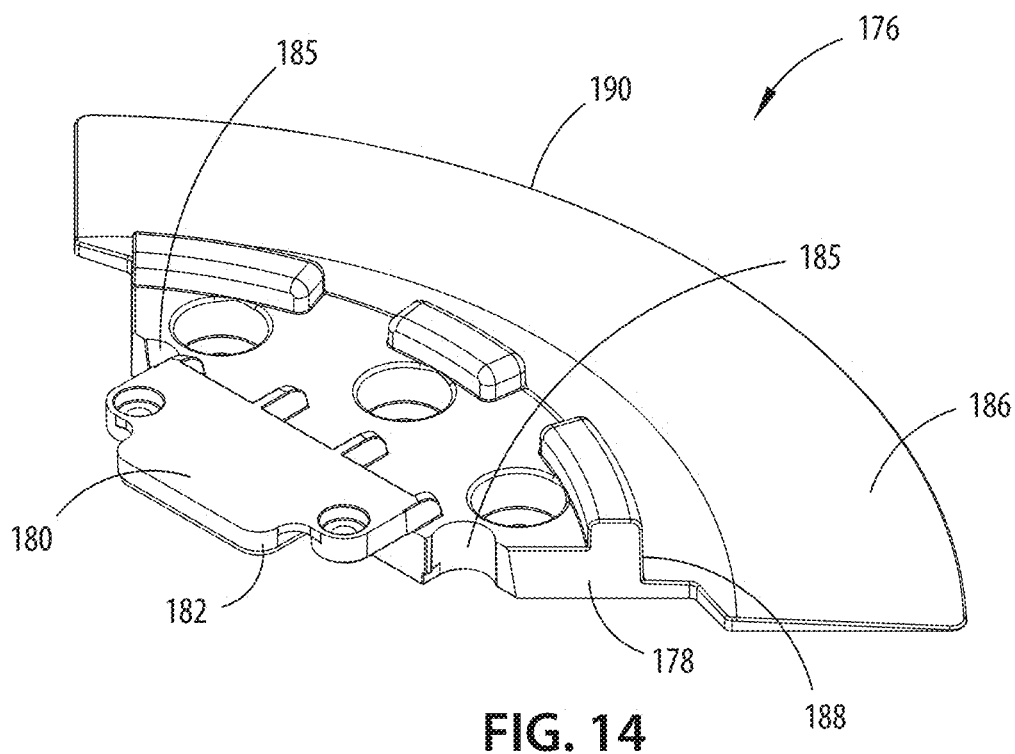
FIG. 14 is a top perspective view of a blank filler.
Figure 15:
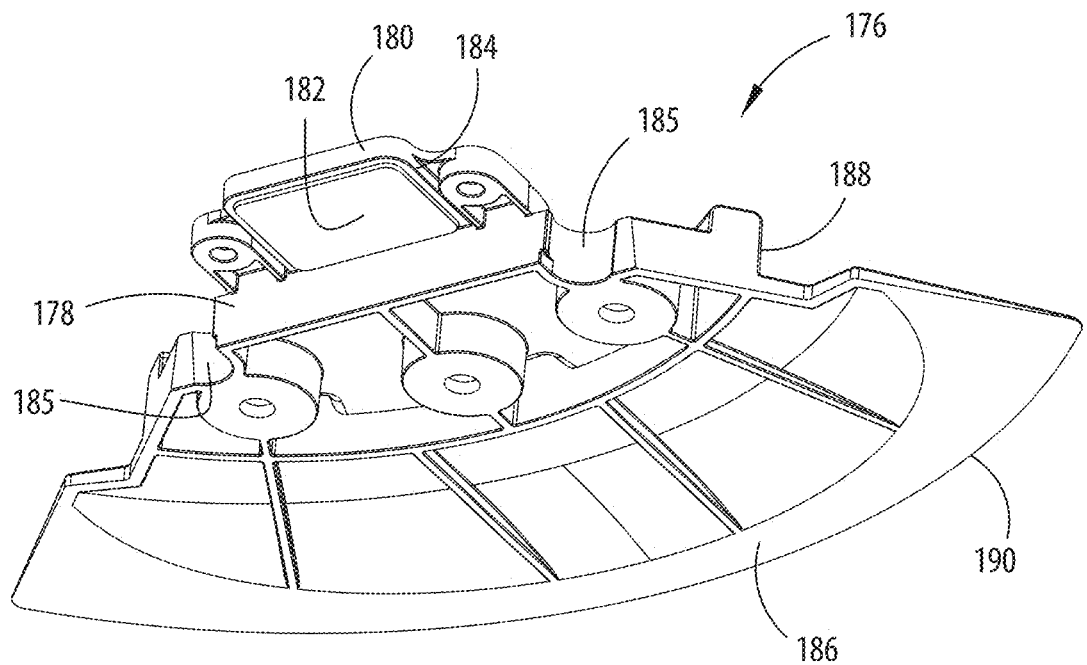
FIG. 15 is a bottom perspective view of a blank filler.

The blank junction assembly 170 may also include one or more blank fillers 176, which are specialized adapters that act as a placeholder when a secondary raceway 16 is not necessary. In FIGS. 14 and 15, a blank filler 176 is shown according to one embodiment. The blank filler 176 may include a stepped configuration, having a lower portion 178 adapted to abut a floor or other surface and a raised portion 180 that is cantilevered from the lower portion 178 to provide an overall low profile configuration when engaged to the hub arrangement 30 of raceway 174. The blank filler 176 may also include a seal member 182 secured to a downwardly facing surface 184 (FIG. 15) of the raised portion 180. The seal member 182 may correspond to a foam water seal configured to abut against the ribs 123 surrounding a corresponding electrical receptacle 122a-122c. The blank filler 176 may further include grooves 185 formed in the lower portion 178 and a ramp 186 that extends outwardly from a rear edge 188 of the lower portion 178. The ramp 186 may be adapted to abut a floor or other surface, and may taper towards an outer end 190, which may include a curved configuration.

Referring back to FIG. 13, the blank filler 176 may be connected to the hub arrangement 30 of raceway 174 in a similar manner to the plug arrangement 140 of a secondary raceway 16, as described previously herein. Specifically, the blank filler 176 may be positioned above a chosen coupling area (e.g. coupling are 38a) of the hub arrangement 30 such that the raised portion 180 of the blank filler 176 is vertically aligned with the corresponding electrical receptacle 122a and grooves 185 of the blank filler 176 are aligned with the appropriate alignment stands 166a. When the blank filler 176 is properly oriented, the blank filler 176 may be engaged to the hub arrangement 30 by moving the blank filler 176 in a substantially vertical downward path with respect thereto. A vertical downward force may be exerted thereon, causing the seal member 182 to compress, thereby forming a substantially watertight seal between the blank filler 176 and the hub arrangement 30 of raceway 174. In such an arrangement, the seal member 182 is parallel to the floor 172 and is positioned between the downwardly facing surface 184 of the blank filler 176 and the upwardly facing surface 124 of the hub arrangement 30. The blank filler 176 may be secured to the hub arrangement 30 via mechanical fasteners 191 to ensure that the seal member 182 is fully compressed.

According to one embodiment, the rear edge 188 of the blank filler 176 and rear edges 192 and 194 of the plug arrangements 140 and raceway 174, respectively, are curved and have the same radius with respect to the recess 130 of the hub arrangement 30. An intermediate trim member 196, exemplarily shown in a multi-piece configuration, may be optionally provided to supplement relatively thin floor coverings and may be similarly included with any of the other junction assemblies described below. The intermediate trim member 196 may be concentrically aligned with and configured to surround each of the rear edges 188, 192, 194, of the blank filler 176, plug arrangements 140, and hub arrangement, respectively. The intermediate trim member 196 may draw support from the branch raceways 32 of the secondary raceways 16 and raceway 174, respectively, along with the ramp 186 of the blank filler 176. Once the intermediate trim member 196 is in position, a floor covering 198 having a cut out portion 200 may be overlaid on the hub arrangement 30, followed in turn by an upper trim member 202 and a blank cover 204. The upper trim member 202 may be configured to enclose the blank cover 204 and may include springs 205 on which the blank cover 204 is positioned. The exposed blank cover 204 may serve to indicate the floor position of blank junction assembly 170 and may include an opening 206 that is vertically aligned with the boss 118 located inside the hub arrangement 30. This allows a mechanical fastener 207 to be inserted through the opening 206 and be received in the boss 118, thereby compressing the springs 205 of the upper trim member 202 such that the blank cover 204 sits flush with the trim member 202 and is fully secured to the hub arrangement 30 of raceway 174.

Figure 16:
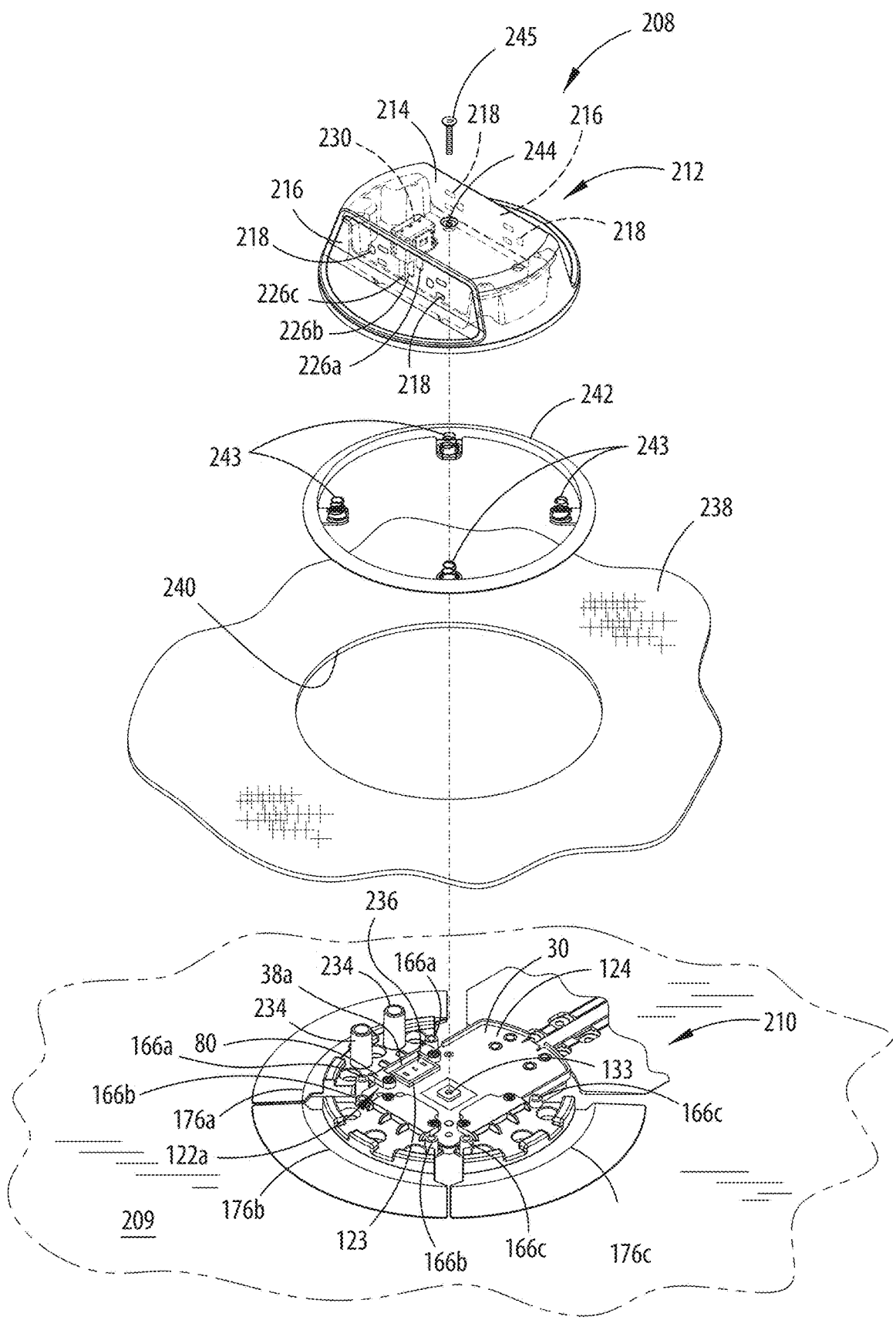
FIG. 16 illustrates a connection arrangement of a NEMA junction assembly.

Referring to FIG. 16, a connection arrangement for a National Electrical Manufacturers Association (hereinafter referred to as "NEMA") junction assembly 208 is shown according to one embodiment. The NEMA junction assembly 208 may abut a floor 209 and includes raceway 210, which may correspond to either a primary raceway 12 or a secondary raceway 16. The NEMA junction assembly 208 generally functions to enable electrical power to be delivered to one or more external electrical devices (not shown) that are connected to a NEMA module 212. The NEMA module 212 is a specialized adapter configured to engage any of the coupling areas 38a-38c of the hub arrangement 30 of raceway 210 and make an electrical connection therewith.

Figure 17:
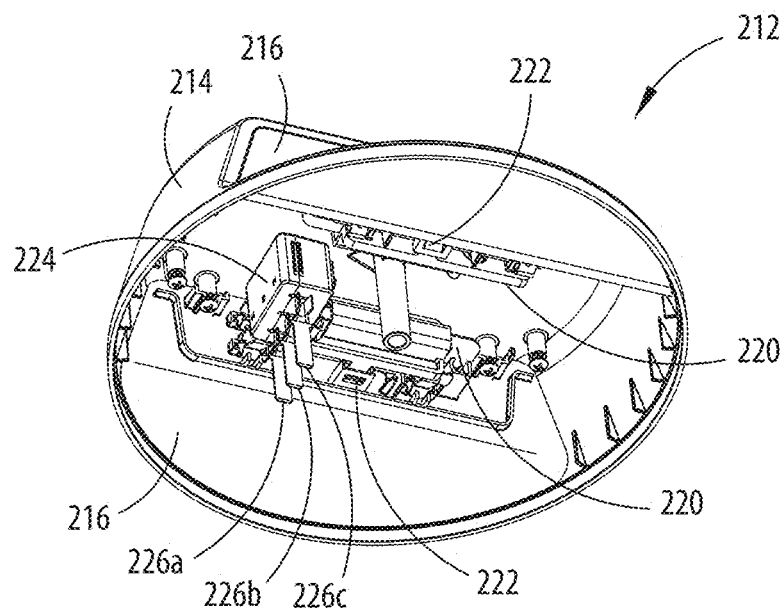
FIG. 17 is a bottom perspective view of a NEMA module, wherein a bottom housing member has been removed.
Figure 18:
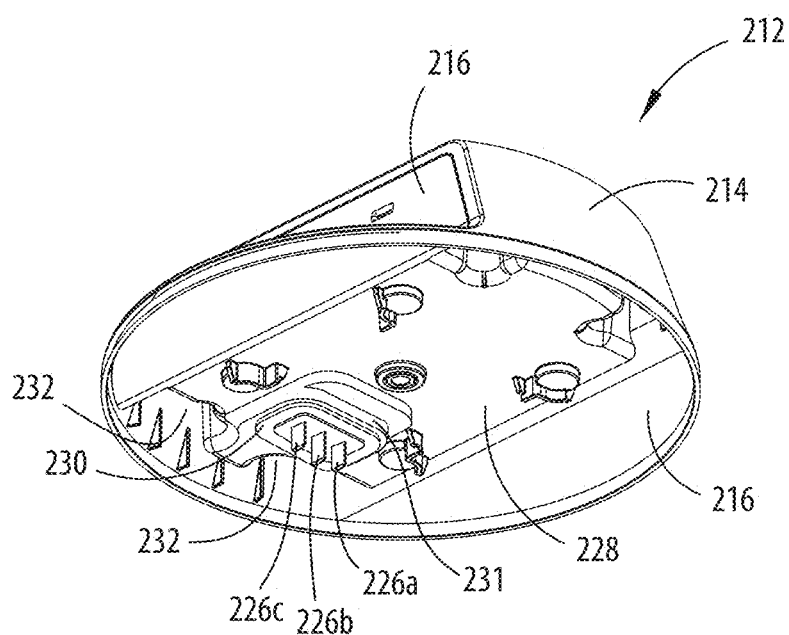
FIG. 18 is a bottom perspective view of the NEMA module showing the bottom housing member.

The NEMA module 212 may include a main housing member 214 and a pair of opposite side panels 216 each having one or more NEMA receptacles 218. Additionally, or alternatively, each side panel 216 may include other receptacle configurations. As best shown in FIG. 17, the NEMA module may further include a bus bar assembly 220 that may be snappedly engaged to each side panel 216 via a snap arrangement 222. Each bus bar assembly 220 is in communication with one or more corresponding NEMA receptacles 218 and may be electrically coupled to an electrical connector 224 secured within the main housing member 214. The electrical connector 224 may include a clamshell plug arrangement having three equally dimensioned and spaced prongs 226a-226c, which may correspond to hot, ground, and neutral, respectively, and may be configured to be received in an electrical receptacle 122a-122c of the hub arrangement 30. As shown in FIG. 18, the prongs 226a-226c may extend through the underside of a bottom housing member 228 that may be sandwiched between the main housing member 214 and the side panels 216. The prongs 226a-226c may extend downwardly from an off-centered location of the bottom housing member 228 and may be surrounded by a seal member 230. The seal member 230 may be secured to a platform 231 located on the underside of the bottom housing member 228 and is configured to seal an electrical receptacle 122a-122c of the hub arrangement 30 of raceway 210. The seal member 230 may be configured as a foam water seal similar to that of the plug arrangement 140 and the blank filler 176 described previously herein. The main housing member 214, side panels 216, and bottom housing member 228 may cooperate to define a pair of relief spaces 232 that are accessed via the underside of the NEMA module 212.

Referring back to FIG. 16, the NEMA module 212 is exemplarily shown oriented to engage coupling area 38a of the hub arrangement 30 of raceway 210. The NEMA junction assembly 208 may include blank fillers 176a-176c, each engaged to a corresponding coupling area 38a-38c of the hub arrangement 30. Blank filler 176a may be modified to include a pair of alignment towers 234 configured to be received the pair of relief spaces 232 of the NEMA module 212, thereby preventing translational or rotational displacement of the NEMA module 212 with respect to the hub arrangement 30. Blank filler 176a may be further modified to not obstruct the electrical receptacle 122a associated with coupling area 38a. For instance, blank filler 176a may include a recessed portion 236 formed in the raised portion 180 to permit access to the corresponding electrical receptacle 122a. Blank fillers 176a and 176b are arbitrarily chosen and may each be substituted for a secondary raceway 16 if desiring to route electrical power in the corresponding floor direction.

In assembly, a floor covering 238 with a cut out portion 240 may be overlaid on the hub arrangement 30, followed by a trim member 242 that may be configured to enclose the NEMA module 212 and may include compression springs 243 on which the NEMA module 212 is positioned. The NEMA module 212 is placed over the hub arrangement 30 such that the prongs 226a-226c are vertically aligned with the corresponding electrical receptacle 122a of coupling area 38a and the pair of relief spaces 232 are vertically aligned with the corresponding pair of alignment towers 234 of blank filler 176a. The NEMA module 212 may be engaged to the hub arrangement 30 by moving the NEMA module 212 in a substantially vertical downward path with respect to the hub arrangement 30. A vertical downward force may be exerted on the NEMA module 212 to cause the prongs 226a-226c to be inserted through the electrical receptacle 122a and be received by the corresponding electrical contacts 98a-98c such that an electrical connection is made between the NEMA module 212 and hub arrangement 30. Furthermore, the vertical downward force compresses the seal member 230 to form a substantially watertight seal between the NEMA module 212 and the hub arrangement 30. Once the prongs 226a-226c have been fully inserted, the seal member 230 may abut and seal against the rib 23 of the corresponding electrical receptacle 122a and the upwardly facing surface 124 of the hub arrangement 30. Additionally, the seal member 230 is positioned between the underside of the NEMA module 212 and the upwardly facing surface 124 of the hub arrangement 30. In such an arrangement, the prongs 226a-226c are substantially perpendicular to the floor 209 and the seal member 230 is substantially parallel to the floor 209. Furthermore, the NEMA module 212 may have an opening 244 in the main housing member 214 that is vertically aligned with the boss 118 inside the hub arrangement 30, thereby allowing the NEMA module 212 to be secured to the hub arrangement 30 via a mechanical fastener 245 that is inserted through the opening 244 and engaged to the boss 118. Doing so causes the springs 243 of the trim member 242 to compress such that only the NEMA module 212 and the trim member 242 are exposed through the cut out portion 240 of the floor covering 238.

Figure 19:
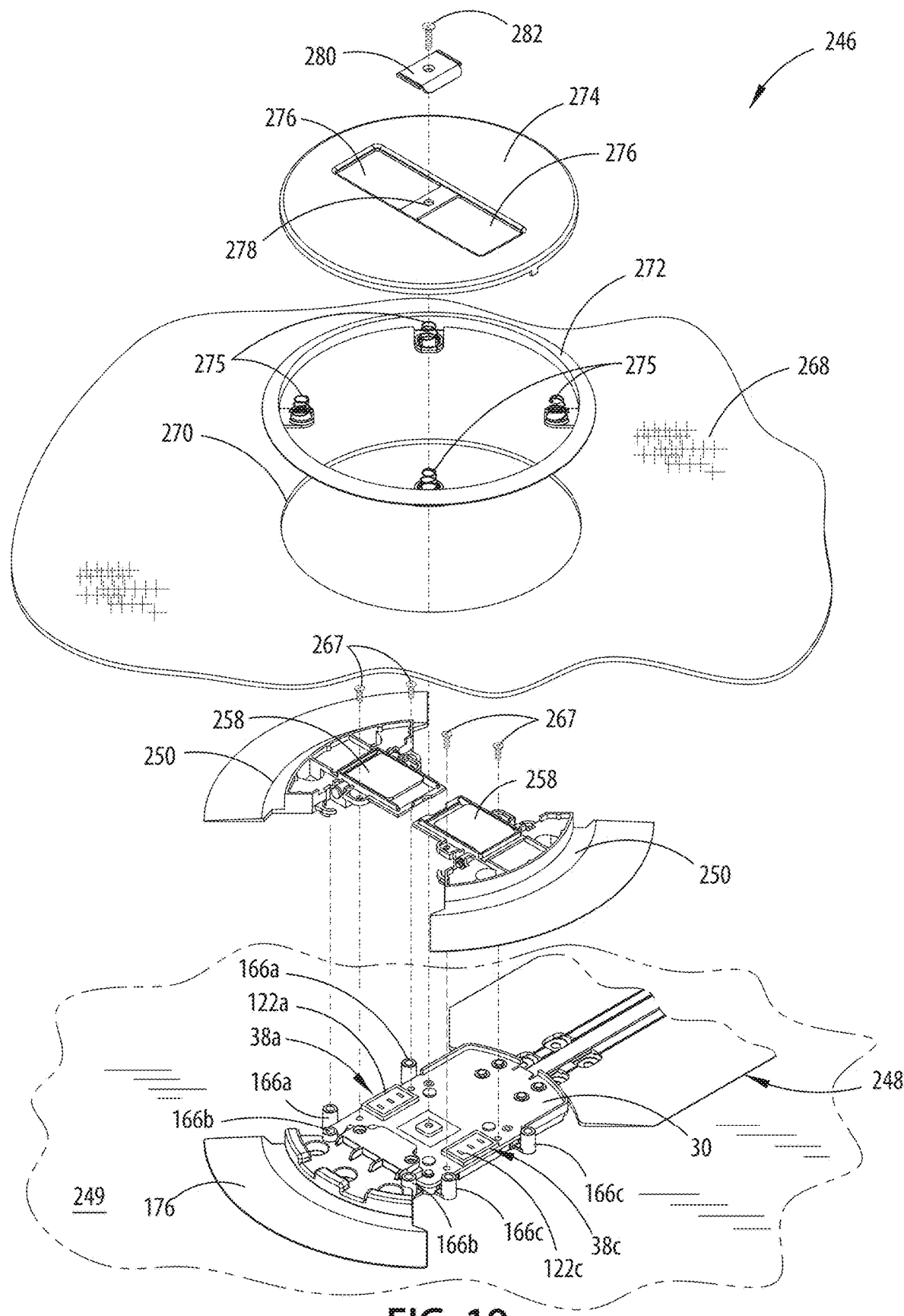
FIG. 19 illustrates a connection arrangement of a door junction assembly in a dual door configuration.
Figure 20:
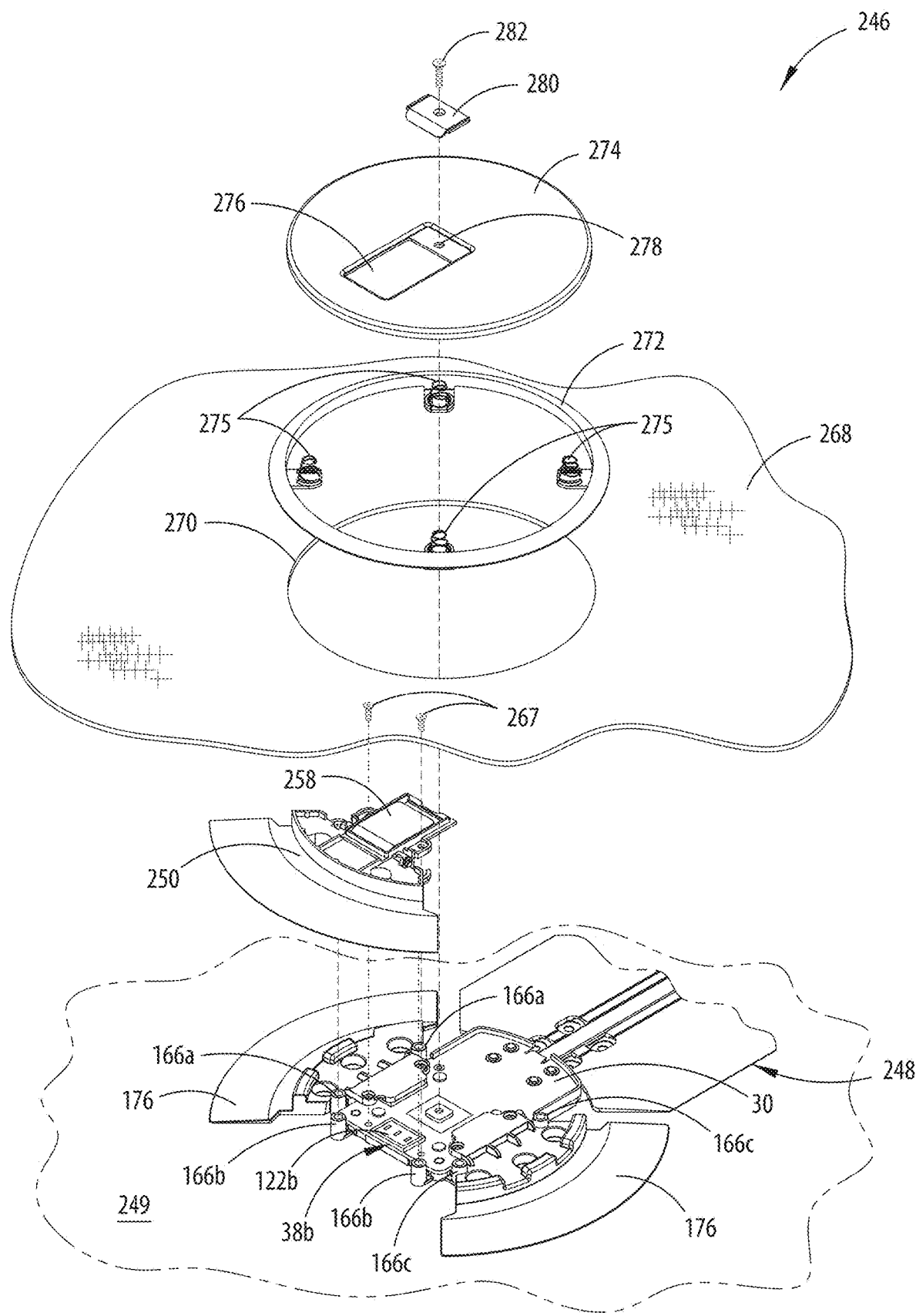
FIG. 20 illustrates a connection arrangement of a door junction assembly in a single-door configuration.

Referring to FIG. 19, a connection arrangement for a door junction assembly 246 is shown according to one embodiment. The door junction assembly 246 includes raceway 248, which may abut a floor 249 and may be configured as a primary raceway 12 or a secondary raceway 16. The door junction assembly 246 generally functions to allow a plug arrangement (not shown) to plug directly into one or more of the electrical receptacles 122a-122c of the hub arrangement 30 of raceway 248. The door junction assembly 246 may also include one or more door modules 250 coupled to the hub arrangement 30 of raceway 248 at any of the coupling areas 38a-38c. With respect to the present embodiment, the door junction assembly 246 is shown in a dual door configuration, where a door module 250 is configured to engage opposite coupling areas 38a and 38c of the hub arrangement 30. Alternatively, the door junction assembly 246 may be assembled in a single door configuration, as shown in FIG. 20, wherein a door module 250 is configured to engage only one coupling area, exemplarily shown as coupling area 38b of the hub arrangement 30. In alternative embodiments of the single door configuration, the door module 250 may be engaged to either coupling area 38a or 38c. Both the single and dual door configurations may be assembled in a similar manner and will be described in greater detail below. For simplicity, blank fillers 176 are shown coupled to the remaining coupling areas 38a-38c of the hub arrangement 30 in FIGS. 19 and 20 and may each be substituted for a different adapter, such as a secondary raceway 16, in alternative embodiments. While a single and dual door configuration are described herein, it should be understood that the door junction assembly 246 may also be arranged in a three door configuration, wherein a door module 250 is engaged to each coupling area 38a-38c.

Figure 21:
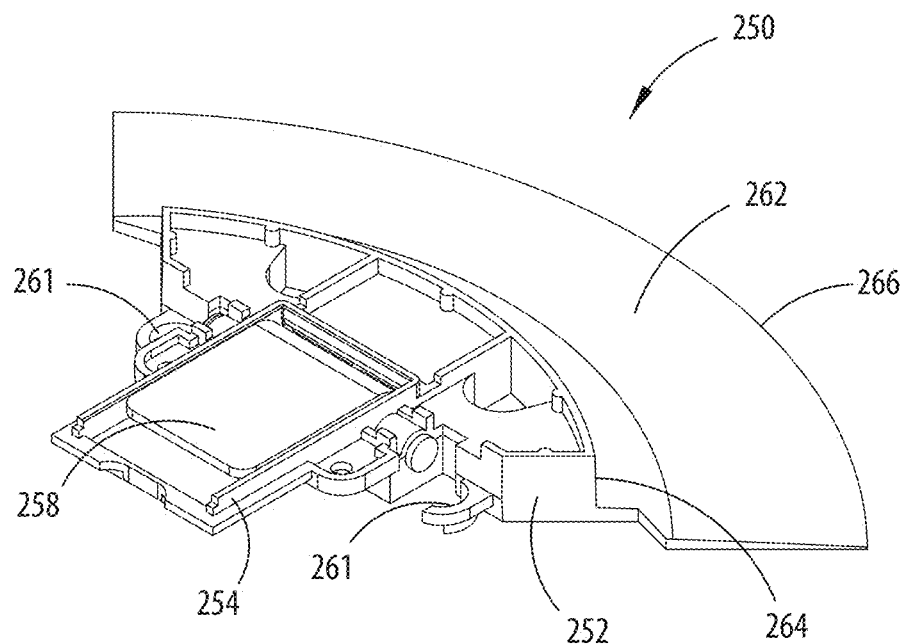
FIG. 21 is a top perspective view a door module.
Figure 22:
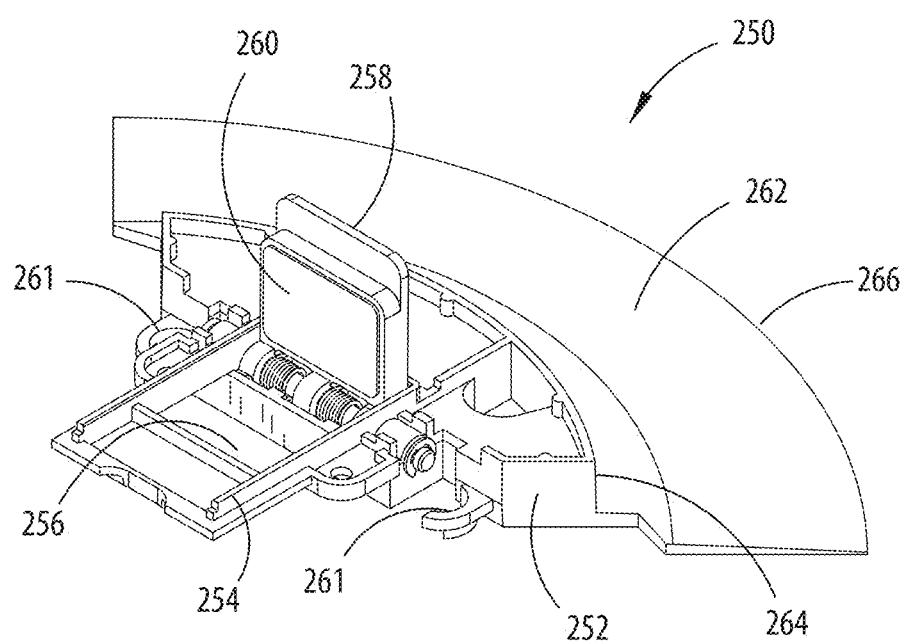
FIG. 22 is a top perspective view of the door module with a door shown in an open position.

The door module 250 is shown in FIGS. 21 and 22 according to one embodiment. The door module 250 is another specialized adapter for use with the system 10 and may include a stepped up configuration having a lower portion 252 adapted to abut a floor or other surface and a raised portion 254 that is cantilevered from the lower portion 252 to provide an overall low profile configuration when engaged to the hub arrangement 30 of raceway 248. The door module 250 may also include a recessed entryway 256 (FIG. 22) in the raised portion 254 that is covered by a spring bias door 258. The door 258 may be movable between a closed position (FIG. 21) preventing access to a corresponding electrical receptacle 122a-122c and an open position (FIG. 22) allowing access to the electrical receptacle 122a-122c. A seal member 260 (FIG. 22) may be secured to the underside of the door 258. The seal member 260 may be configured as a foam water seal and is configured to seal the corresponding electrical receptacle 122a-122c when the door 258 is in the closed position. The door module 250 may also include grooves 261 and a ramp 262 that extends outwardly from a rear edge 264 of the lower portion 252. The ramp 262 may be adapted to abut a floor or other surface and may taper towards an outer end 266, which may have a curved configuration.

Referring back to FIGS. 19 and 20, a given door module 250 may be secured to the hub arrangement 30 in a similar manner as the blank filler 176, described previously herein. Specifically, the door module 250 may be positioned above the corresponding coupling portion 38a-38c of the hub arrangement 30 such that the raised portion 254 of the door module 250 is vertically aligned with the corresponding electrical receptacle 122a-122c and the grooves 261 are vertically aligned with the alignment stands 166a-166c associated with the corresponding coupling portion 38a-38c. The door module 250 may then be engaged to the hub arrangement 30 by moving the door module 250 in a substantially vertical downward path with respect thereto. Next, a vertical downward force may be exerted on the door module 250 to compress the seal member 260, thereby forming a substantially watertight seal between the door module 250 and the hub arrangement 30. The door module 250 may then be engaged to the hub arrangement 30 via mechanical fasteners 267. Once engaged, the corresponding electrical receptacle 122a-122c may be located within the recessed entryway 256 of the raised portion 254 of the door module 250. When the door 258 is in the closed position, the seal member 260 is substantially parallel to the floor 249 and may abut and seal against the rib 123 of the corresponding electrical receptacle 122a-122c. A floor covering 268 having a cut out portion 270 may be overlaid on the hub arrangement 30, followed in turn by a trim member 272 and a door cover 274, such that only the trim member 272 and the door cover 274 are exposed. The door cover 274 may be enclosed by the trim member 272 and placed upon compression springs 275 of the trim member 272. The door cover 274 may include one or more radially extending door openings 276 to allow access to each door 258 and may also include a center opening 278 and center cap 280 combination that are each vertically aligned with the boss 118 located within the hub arrangement 30. A mechanical fastener 282 may be inserted through the center cap 280 and center opening 278 and be received by the boss 118, thereby compressing the springs 275 such that the door cover 274 sits flush with the trim member 272 and is fully secured to the hub arrangement 30.

Figure 23:
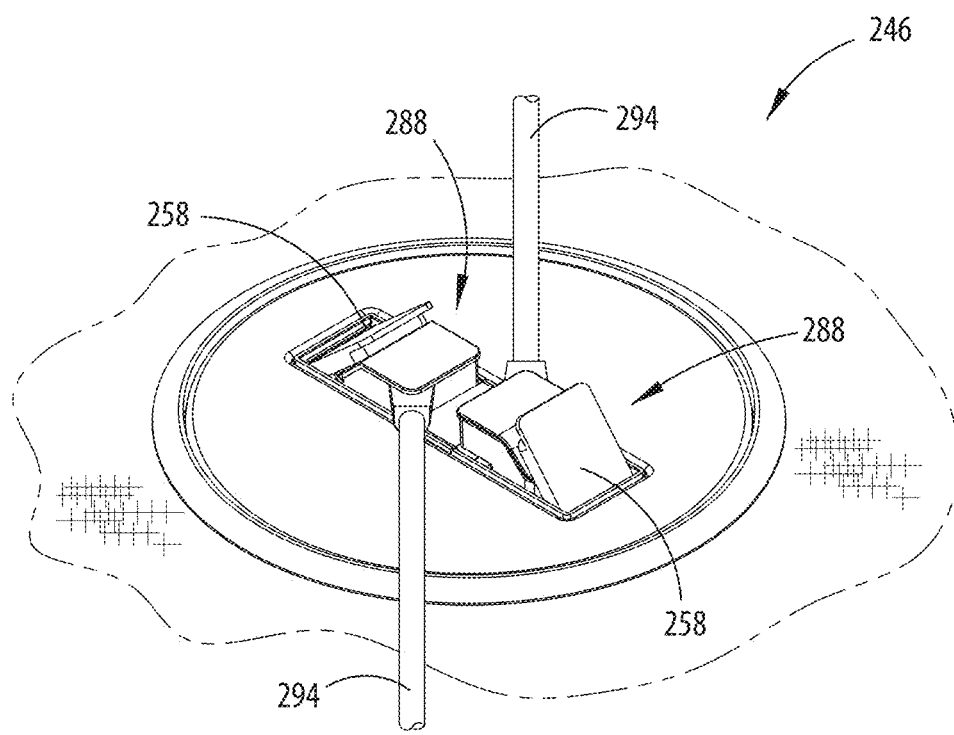
FIG. 23 illustrates a dual plug arrangement engaged to the door junction assembly shown in FIG. 19.
Figure 24:
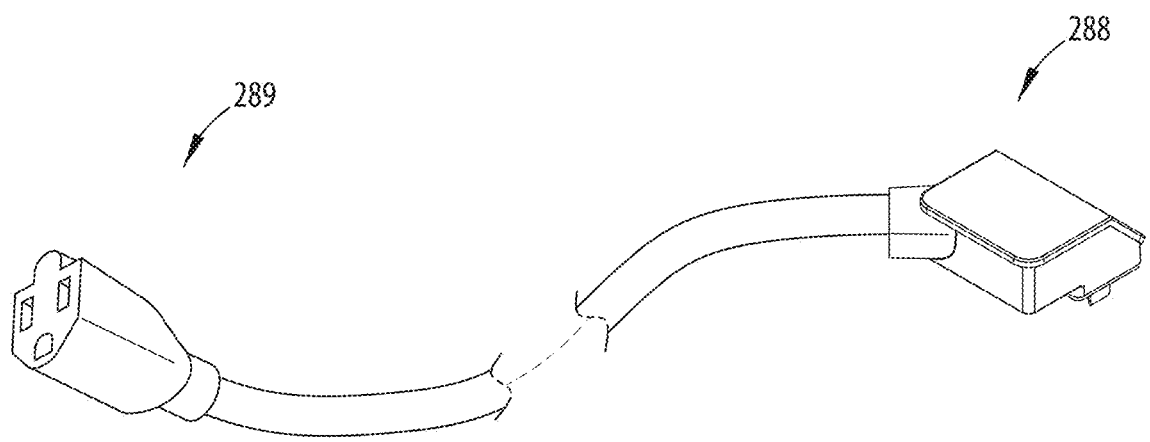
FIG. 24 illustrates a plug arrangement electrically connected to a NEMA receptacle.

Referring to FIG. 23, a pair of plug arrangements 288 is shown engaged with the door junction assembly 246 shown previously in FIG. 19. In the presently illustrated embodiment, each plug arrangement 288 is engaged to a corresponding electrical receptacle 122a, 122c. Each plug arrangement 288 is a specialized adapter for use with the system 10 and may route electrical power directly to an external electrical device or to a power distribution module configured to make one or more electrical connections. For example, as shown in FIG. 24, a given plug arrangement 288 may be electrically connected to a NEMA receptacle 289.

Figure 25:
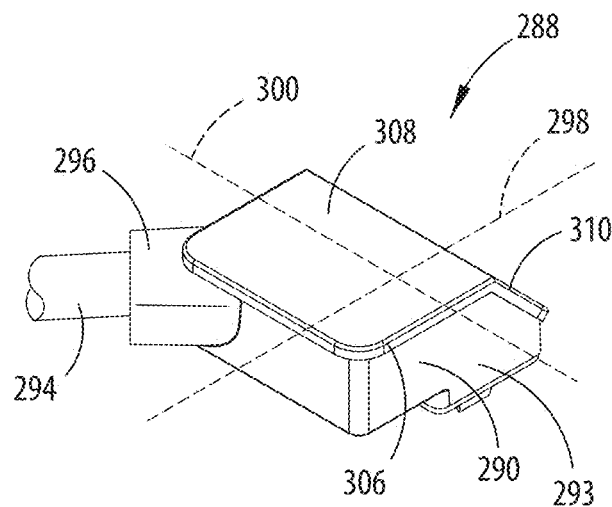
FIG. 25 is a top perspective view of the plug arrangement.
Figure 26:
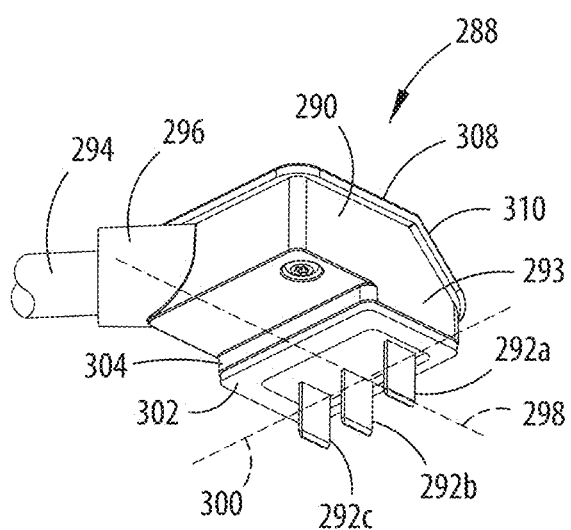
FIG. 26 is a bottom perspective view of the plug arrangement.

As best shown in FIGS. 25 and 26, a plug arrangement 288 may include a plug housing 290 having three equally dimensioned and spaced prongs 292a-292c extending from a lower portion 293. The prongs 292a-292c may correspond to hot, ground, and neutral, respectively, and are configured to be received in an electrical receptacle 122a-122c of the hub arrangement 30 of a raceway (e.g. raceway 248). The prongs 292a-292c may be electrically coupled to an electrical supply line 294 that is engaged to the plug housing 290 via a cable connector 296 that extends at an angle relative to a longitudinal axis 298 and a lateral axis 300 of the plug housing 290. Each plug arrangement 288 may also include a seal member 302 that is secured to a downwardly facing surface 304 (FIG. 26) of the lower portion 293 and may surround the prongs 292a-292c. The seal member 302 of each plug arrangement 288 may be configured as a foam water seal that is contoured to the shape of the ribs 123 surrounding the corresponding electrical receptacles 122a-122c. Each plug arrangement 288 may further include an upper surface 306 having a flat portion 308 and a chamfered or angled portion 310.

Referring back to FIG. 23, assembly of each plug arrangement 288 to the door junction assembly 246 first requires moving each door 258 to the open position to reveal a corresponding electrical receptacle 122a, 122c of the hub arrangement 30. By virtue of the position of the electrical receptacle 122a, 122c relative to its associated open door 258, each plug arrangement 288 may only be inserted into the corresponding electrical receptacle 122a, 122c in a single orientation, thereby ensuring a proper electrical connection is made between each plug arrangement 288 and the hub arrangement 30. Each plug arrangement 288 may be positioned above the corresponding electrical receptacle 122a, 122c such that the prongs 292a-292c are vertically aligned therewith. A vertical downward force may be exerted on each plug housing 290 to cause the prongs 292a-292c to be inserted through the corresponding electrical receptacle 122a, 122c and be received by the corresponding electrical receptacles 102a, 102c within the hub arrangement 30 such that an electrical connection is made between each plug arrangement 288 and the hub arrangement 30. Furthermore, the vertical downward force compresses the seal member 302 of each plug arrangement 288 to form a substantially watertight seal between each plug arrangement 288 and the hub arrangement 30. Specifically, once the prongs 292a-292c have been fully inserted, a seal may be made between the downwardly facing surface 304 and the upwardly facing surface 124 of the hub arrangement 30, thereby sealing the corresponding electrical receptacle 122a, 122c. In that position, the prongs 292a-292c of each plug arrangement 288 are substantially perpendicular to the floor 249 and the seal member 302 of each plug arrangement is substantially parallel to the floor 249. Also, the lower portion 293 of each plug arrangement 288 may sit deeply within the recessed entryway 256 of the corresponding door module 250. Additionally, the door 258 of each door module 250 may abut and may be substantially aligned with the angled portion 310 of the corresponding plug arrangement 288 to provide a low profile configuration. Further, the electrical supply lines 294 of each plug arrangement 288 may extend in substantially opposite directions and may be parallel to each other.

Accordingly, various connection arrangements have been advantageously described herein in great detail. The connection arrangements may be implemented in a floor power distribution system 10 and may include one or more junction assemblies formed at the hub arrangement 30 of either a primary raceway 12 or a secondary raceway 16. It should be understood, however, that the system 10 is not limited to the use of any particular junction assembly. That is, the system 10 may employ some or all of the junction assemblies described previously. Thus, the system 10 may be arranged in numerous connection arrangements based on the needs of the user.

Figure 27:
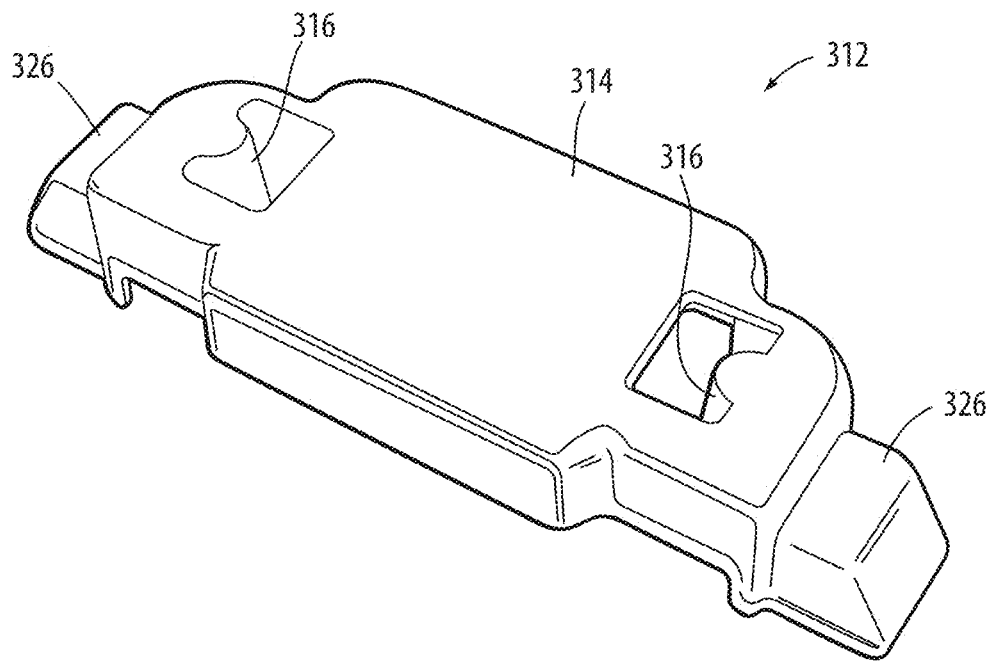
FIG. 27 is a top perspective view of a protective cap according to one embodiment.
Figure 28A:
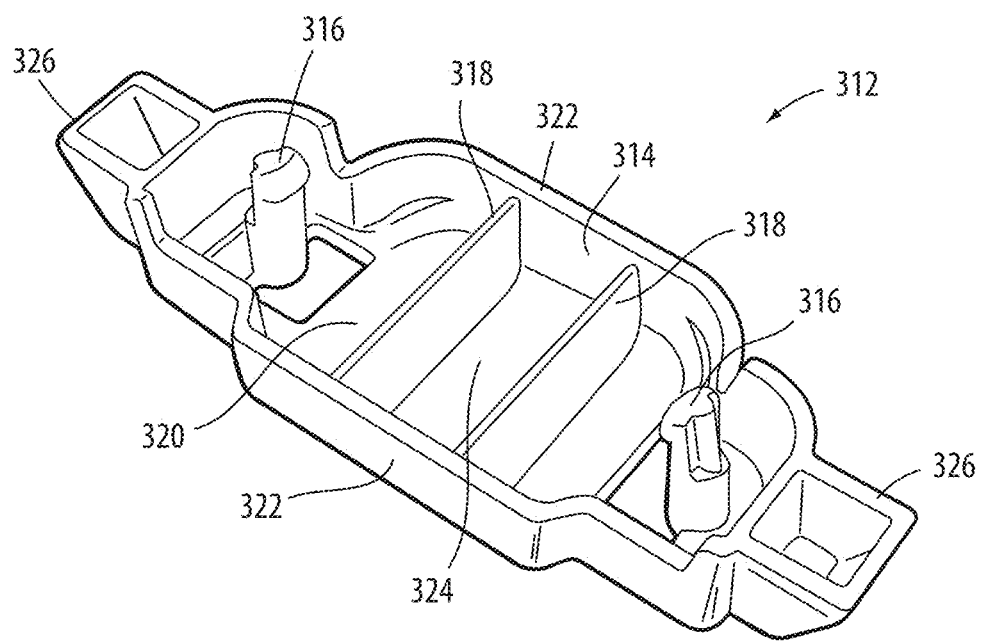
FIG. 28A is a bottom perspective view of the protective cap shown in FIG. 27.
Figure 28B:
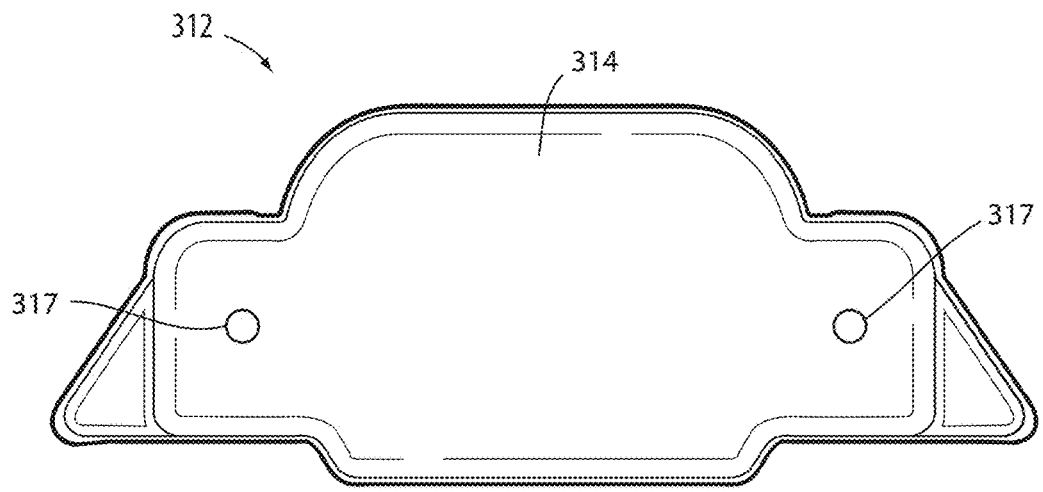
FIG. 28B is a top perspective view of an alternative embodiment of the protective cap shown in FIG. 27.
Figure 28C:
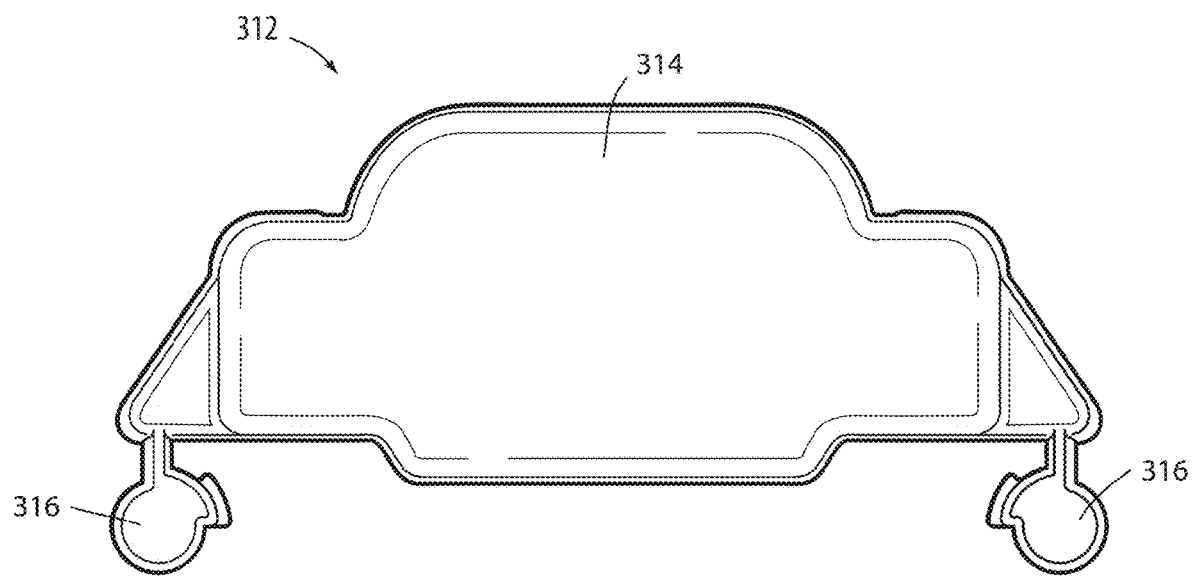
FIG. 28C is a top view of yet another alternative embodiment of the protective cap shown in FIG. 27.

Referring to FIGS. 27 and 28A, a protective cap 312 is shown for protecting the prongs 160a-160c and the seal member 156 of the plug arrangement 140 described herein in reference to FIGS. 10-12 during transport, handling, etc. The protective cap 312 may be constructed from plastic or other rigid or semi-rigid material and may include a body portion 314 that is substantially contoured to the raised portion 148 of the plug housing 144. The protective cap 312 may also include a pair of downwardly extending bosses 316 that are spaced to be snappedly received within the openings 162 (FIG. 10) through the raised portion 148 of the plug housing 144. Alternatively, as shown in FIG. 28B, the protective cap 312 may include openings 317 instead of the bosses 316 to allow mechanical fasteners (e.g., screws) to be received therethrough and engaged to openings 162 of the plug housing 144 for securing the protective cap 312 to the plug arrangement 140. Alternatively still, as shown in FIG. 28C, the bosses 316 may be elsewhere located on the protective cap 312 and positioned extend from the body portion 314 to snappedly engage grooves 168 (FIG. 12) of the plug housing 144. Apart from the differences illustrated in FIGS. 28B and 28C, the protective cap 312 shown in FIGS. 28B and 28C may otherwise be similarly configured to the protective cap 312 shown and described herein with reference to FIGS. 27 and 28A. As best shown in FIG. 28A, a pair of guard walls 318 may extend across the underside 320 of the body portion 314 and may be adjoined to a pair of opposing sidewalls 322 to create an enclosed space 324 within which the prongs 160a-160c of the plug arrangement 140 are housed when the protective cap 312 is engaged with the raised portion 148 of the plug housing 144. It is noted that the guard walls 318 may be parallel with each other and may be perpendicular with the sidewalls 322. A pair of opposing handles 326 may extend outwardly from the body portion 314 and may be exposed to allow a user to apply pressure to the protective cap 312 so it can be disengaged from the raised portion 148 of the plug housing 144.

Figure 29:
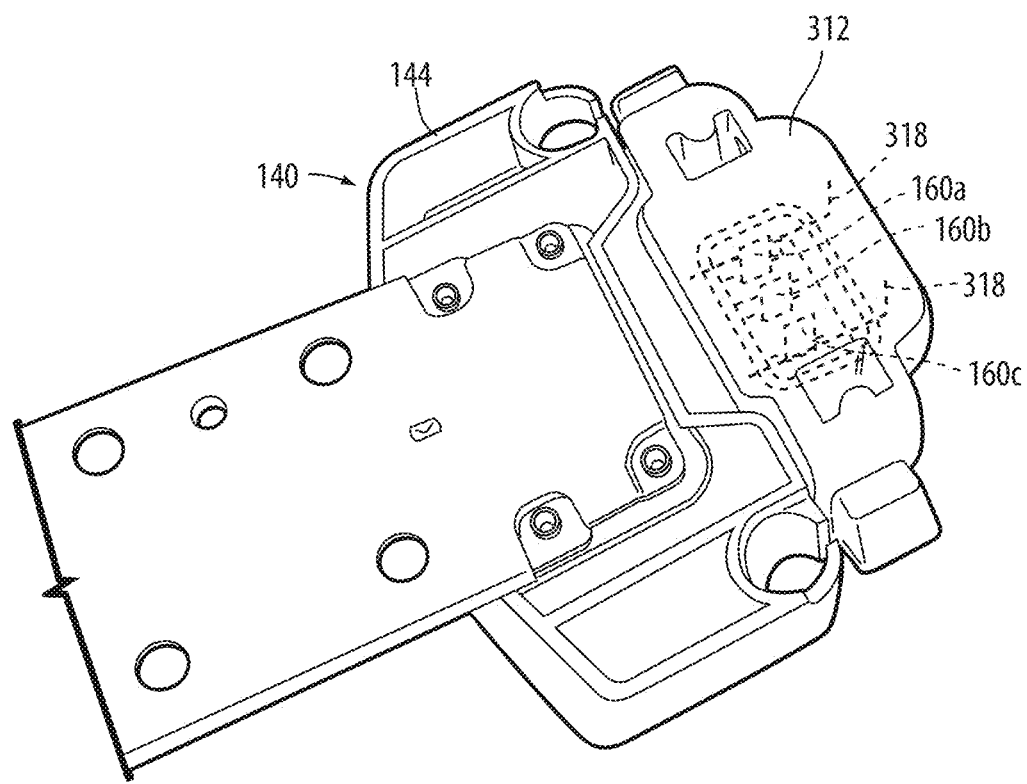
FIG. 29 illustrates the protective cap of FIGS. 27 and 28A engaged to a plug arrangement.

In assembly, the protective cap 312 may be oriented relative to the raised portion 148 of the plug housing 144 such that the bosses 316 are aligned with the corresponding openings 162 of the raised portion 148 of the plug housing 144 and the underside 320 of the body portion 314 faces the tips of the prongs 160a-160c of the plug arrangement 140. Assuming the plug arrangement 140 is oriented so that the prongs 160a-160c point upwardly, the protective cap 312 may be engaged to the raised portion 148 of the plug housing 144 by moving it in a downward motion until the bosses 316 snappedly engage the openings 162 of the raised portion 148 of the plug housing 144. For purposes of illustration, the protective cap 312 is generally shown engaged to the raised portion 148 of the plug housing 144 in FIG. 29. When the protective cap 312 is engaged to the raised portion 148 of the plug housing 144, the seal member 156 and the prongs 160a-160c of the plug arrangement 140 may be covered by the body portion 314 of the protective cap 312. The guard walls 318 of the protective cap 312 may be located above the seal member 156 in abutting contact therewith or spaced therefrom and the prongs 160a-160c may be housed between the guard walls 318 and the sidewalls 322 of the body portion 314. With respect to the illustrated embodiment, the prongs 160a-160c may run parallel to the guard walls 318 and perpendicularly to the side walls 322 when the protective cap 312 is in the engaged position.

Figure 30:
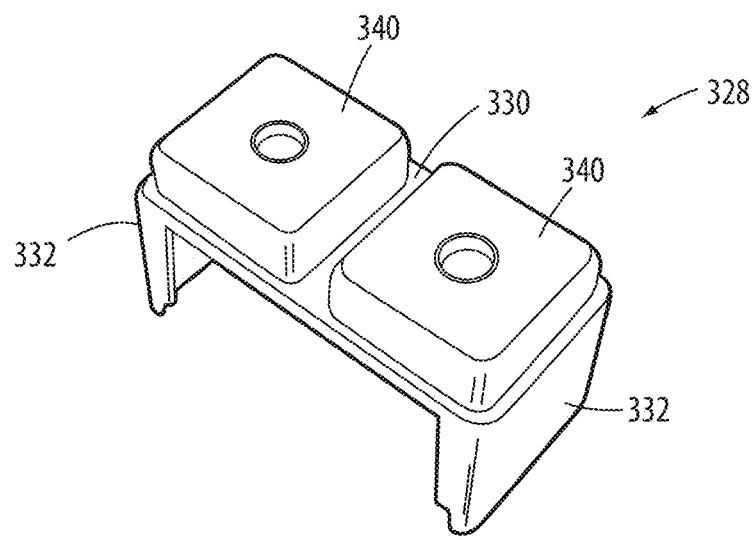
FIG. 30 is a top perspective view of a protective cap according to another embodiment.
Figure 31:
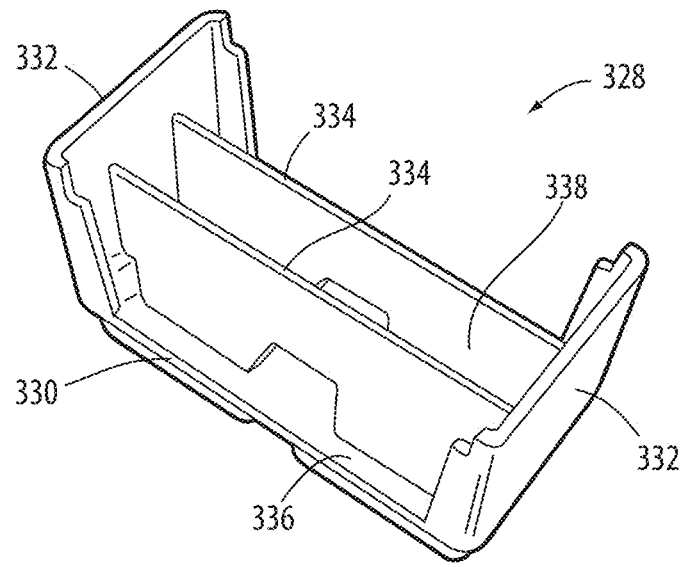
FIG. 31 is a bottom perspective view of the protective cap shown in FIG. 30.
Figure 32:
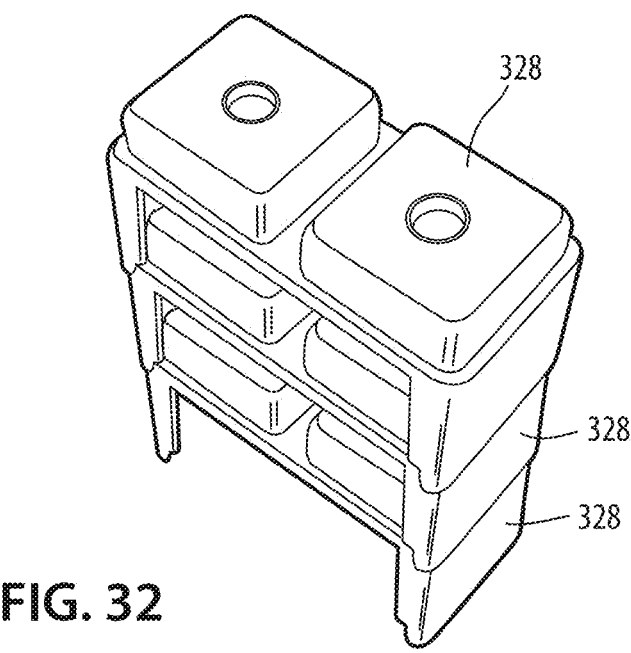
FIG. 32 illustrates several protective caps in a stacked arrangement.

Referring to FIGS. 30 and 31, a protective cap 328 is shown for protecting the prongs 226a-226c and the seal member 230 of the NEMA module 212 described herein in reference to FIGS. 17 and 18 during transport, handling, etc. The protective cap 328 may be constructed from plastic or other rigid or semi-rigid material and may include a body portion 330 and a pair of opposing legs 332 extending perpendicularly from the body portion 330. The pair of opposing legs 332 may be configured to frictionally engage the platform 231 on which the seal member 230 is located and through which the prongs 226a-226c extend. A pair of guard walls 334 may extend across the underside 336 of the body portion 330 and may be adjoined to the legs 332 to create an enclosed space 338 within which the prongs 226a-226c of the NEMA module 212 are housed when the protective cap 328 is engaged to the platform 231. It is noted that the guard walls 334 may be parallel with each other and may be perpendicular with the legs 332. The protective cap 328 may also include a pair of square-shaped uprights 340 extending from the body portion 330 in a direction opposite to the legs 332. The uprights 340 may be positioned slightly inward of the periphery of the body portion 330 such that they may be frictionally engaged by the legs 332 of another protective cap 328, thereby allowing multiple protective caps 328 to be arranged in a stacked configuration as exemplarily demonstrated in FIG. 32. The stacking of multiple protective caps 328 not only serves to save space but may also be a fun activity. Thus, it is contemplated that the protective caps 328 may also function as a toy when not in use.

Figure 33:
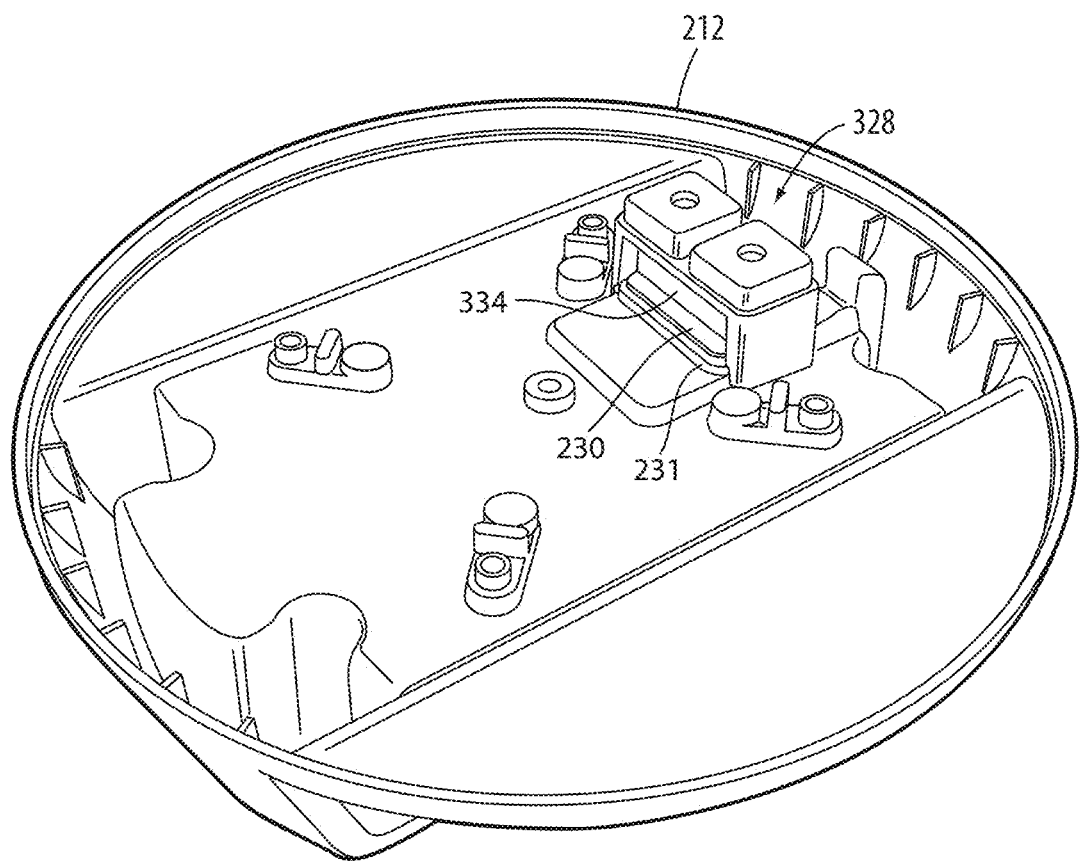
FIG. 33 illustrates the protective cap of FIGS. 30 and 31 engaged to a plug arrangement of a NEMA module.

In assembly, the protective cap 328 may be oriented relative the NEMA module 212 such that the underside 336 of the body portion 330 faces the tips of the prongs 226a-226c and the seal member 230 of the NEMA module 212. Assuming the prongs 226a-226c point upwardly, the protective cap 328 may be moved downward such that the legs 332 frictionally engage the platform 231 and the guard walls 334 frictionally engage the prongs 226a-226c. For purposes of illustration, the protective cap 328 is shown engaged to the platform 231 on the underside of the NEMA module 212 in FIG. 33. When the protective cap 328 is in the engaged position, the body portion 330 may cover the seal member 230 and the prongs 226a-226c. The guard walls 318 of the protective cap 334 may be located above the seal member 230 in abutting contact therewith or spaced therefrom. Additionally, the prongs 226a-226c may be housed between the guard walls 334 and the legs 332. While the protective cap 328 is in the engaged position, the prongs 226a-226c may run perpendicularly to the guard walls 334 and parallel with the legs 332.

Figure 34:
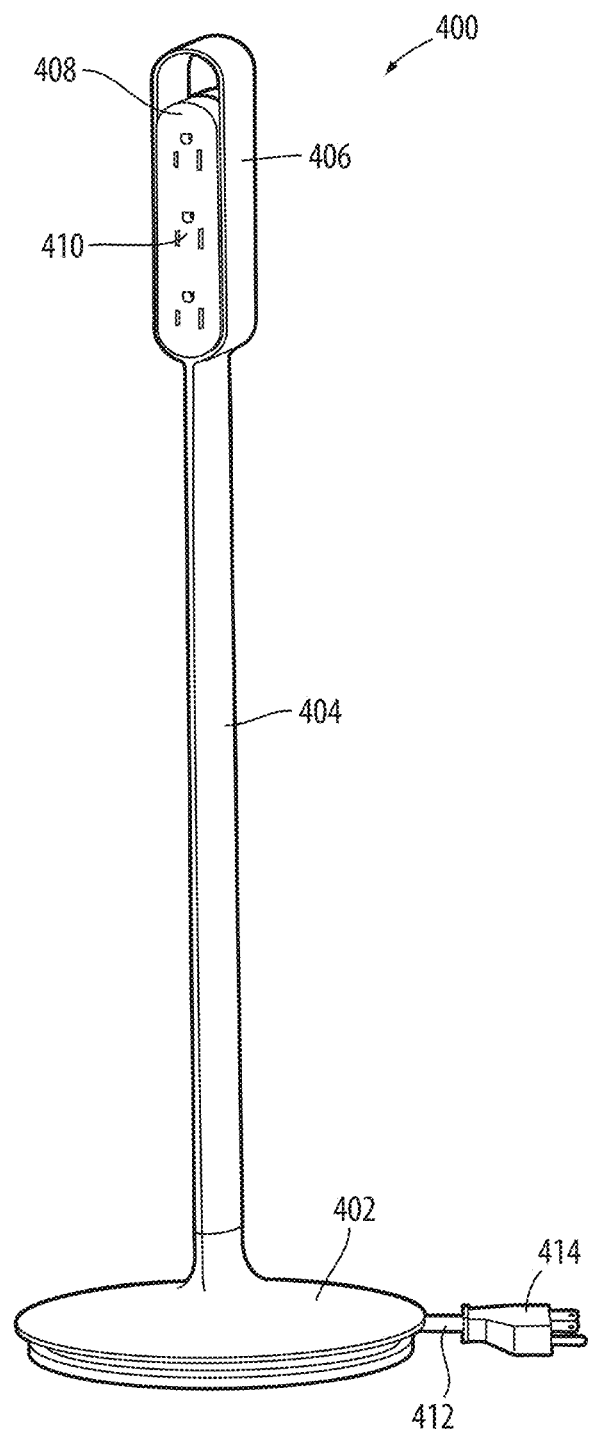
FIG. 34 is a front perspective view of a power hub according to one embodiment.

Referring to FIG. 34, a power hub 400 is shown according to one embodiment. The power hub 400 may include a weighted base assembly 402, a shaft 404, and an impact loop 406. An electrical receptacle block 408 may be secured inside the impact loop 406 and may include one or more electrical receptacles 410 each configured to receive a complimentary electrical plug (not shown) of an electronic device. A power cord 412 may be housed inside the weighted base assembly 402 and may include a plug 414 for engaging a complimentary electrical receptacle (not shown). It is contemplated that the power hub 400 may be used in conjunction with the floor powered distribution system 10 described herein or otherwise be used with a floor outlet, a wall outlet, or other power distribution systems to provide power to one or more electronic devices that are plugged into the electrical receptacle block 408. According to one embodiment, the plug 414 of the power cord 412 may be configured as a NEMA type plug thereby enabling the plug 414 to be plugged into the NEMA module 212 of the floor powered distribution system 10 or other compatible receptacle such as the NEMA receptacle 289 shown in FIG. 24. Alternatively, the plug 414 may be configured similarly to the plug arrangement 288 described herein to enable the plug 414 to be plugged into an available electrical receptacle 122a-122c of a hub arrangement 30 located at a door junction assembly (e.g., door junction assembly 246).

Figure 35:
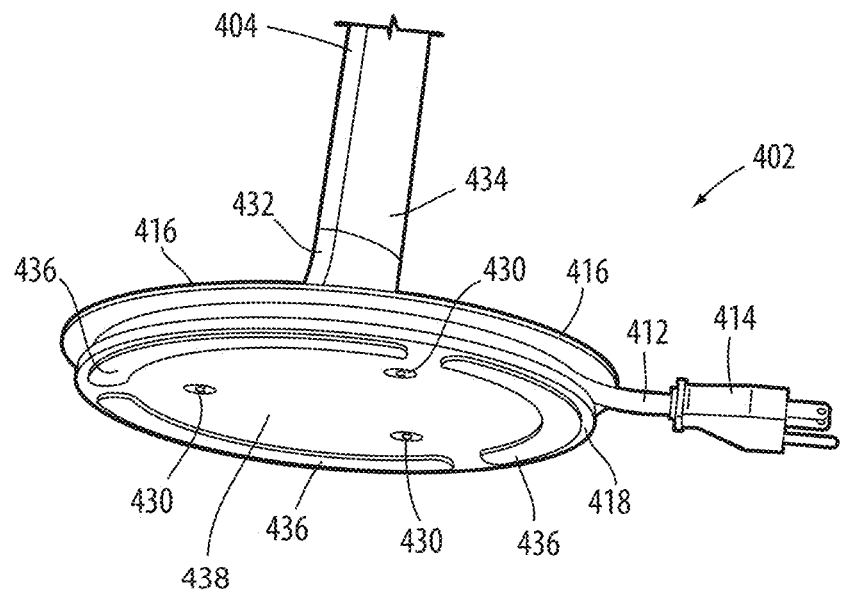
FIG. 35 is a bottom perspective view of a weighted base assembly.
Figure 36:
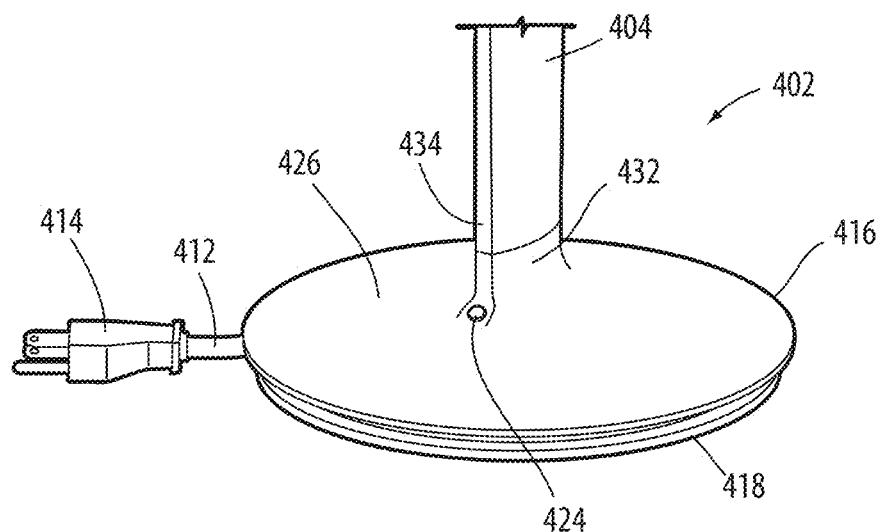
FIG. 36 is a front perspective view of the weighted base assembly.
Figure 37:
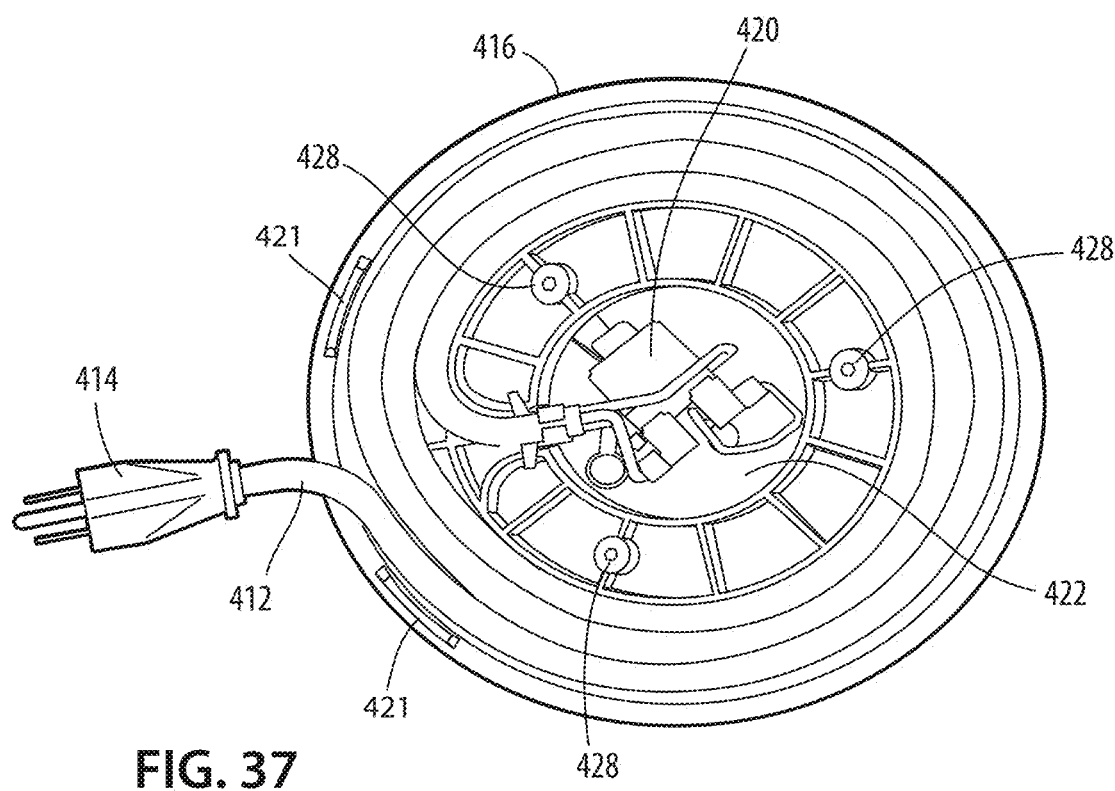
FIG. 37 is bottom view of an upper member of the weighted base assembly.

Referring to FIGS. 35 and 36, the weighted base assembly 402 and a lower portion of the shaft 404 are shown according to one embodiment. The weighted base assembly 402 may include an upper member 416 coupled to a lower member 418 in a spaced-apart relationship. The power cord 412 may be stored in a coiled configuration between the upper member 416 and the lower member 418 and may be secured to a circuit breaker 420 that may be coupled to an underside portion 422 of the upper member 416 (FIG. 37). The power cord 412 may be manually extended and returned to the weighted base assembly 402. A pair of downwardly extending protrusions 421 may be provided near the periphery of the underside portion 422 to assist with securing the power cord 412 in the stowed position. A reset button 424 (FIG. 36) for the circuit breaker 420 may be provided on a topside 426 of the upper member 416. As best shown in FIG. 37, one or more threaded members 428 may be located on the underside portion 422 of the upper portion 416 and are aligned with complimentary openings on the lower member 418 to enable the upper member 416 to be coupled to the lower member 418 via mechanical fasteners 430 (FIG. 35).

Referring still to FIGS. 35 and 36, the upper member 416 of the weighted base assembly 402 may include a neck 432 configured to mate with a lower end 434 of the shaft 404 in a sheathed configuration. For instance, the lower end 434 of the shaft 404 may be configured to partially encase the neck 432 or vice versa. However, it should be appreciated that other methods (e.g., using mechanical fasteners) may be used for coupling the weighted base assembly 402 to the shaft 404 if desired. The neck 432 and shaft 404 may both be hollow and open on each end to enable the plug 414 to be wired to the electrical receptacle block 408. In the illustrated embodiment, the neck 432 and the shaft 404 may each have an oval-like cross-section but may have other cross-sectional shapes if desired.

According to one embodiment, the weighted base assembly 402 may be constructed from a material that imparts a substantial heaviness thereto relative to the other components of the power hub 400 such as the shaft 404, the impact loop 406, and the electrical receptacle block 408. In one embodiment, the upper member 416 of the weighted base assembly 402 may be constructed from a non-ferrous material such as zinc and the lower member 418 of the weighted base assembly 402 may be constructed from a ferrous material such as iron while the shaft 404, impact loop 406, and electrical receptacle block 408 may be constructed from plastic. In alternative embodiments, the upper and lower members 416, 418 may be constructed using the same material such as zinc or iron. Also, it is contemplated that the shaft 404 may be constructed from aluminum. Based on the height of the power hub 400 and by virtue of the relative weight of the weighted base assembly 402, it is contemplated that the power hub 400 may be tipped up to 45 degrees with respect to its vertical axis and still be able to return to a standing position. The lower member 418 may include one or more anti-slide members 436 provided on an underside portion 438 of the lower member 418 to provide traction on slick surfaces such as tile, hardwood floors, and the like. The anti-slide members 436 may be constructed from rubber or other types of gripping materials and may be concentrically aligned proximate the periphery of the lower member 418 or be otherwise arranged on the underside portion 438 of the lower member 418.

Figure 38:
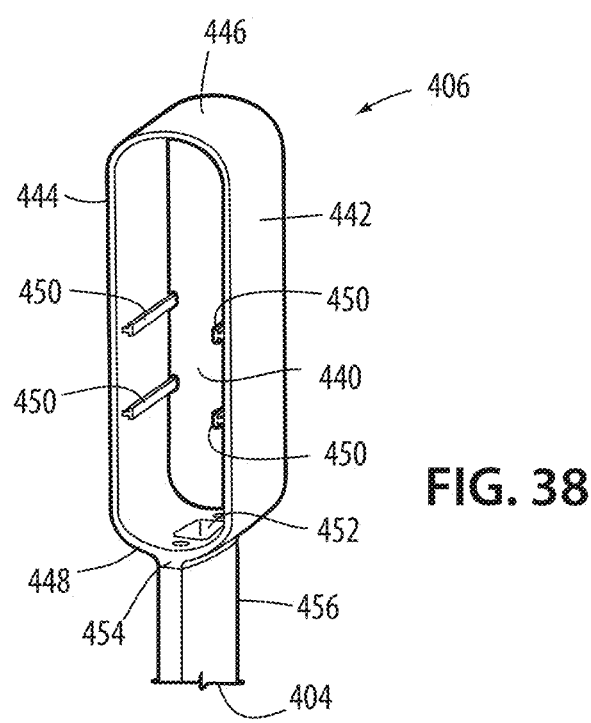
FIG. 38 is a front perspective view of an impact loop.

Referring to FIG. 38, the impact loop 406 and an upper portion of the shaft 404 are shown according to one embodiment. The impact loop 406 may be configured to house the electrical receptacle block 408 therein and insulates it from damage should the power hub 400 be dropped against the floor or other support surface. In the presently illustrated embodiment, the impact loop 406 may have an obround shape and may include a cavity 440 defined by side walls 442 and 444, upper curved portion 446, and lower curved portion 448. The side walls 442, 444 may each include one or more T-shaped rails 450 extending therefrom into the cavity 440. As will be described further herein, the T-shaped rails 450 may help to secure the electrical receptacle block 408 within the impact loop 406. To enable the electrical receptacle block 408 to be wired to the plug 414 of the power cord 412, an opening 452 may be formed through the lower curved portion 448 of the impact loop 406 and extends through a neck 454 therebelow. The neck 454 may be configured to mate with an upper end 456 of the shaft 404 in a sheathed configuration or may be otherwise coupled thereto (e.g., via mechanical fasteners). In the illustrated embodiment, the neck 454 and the shaft 404 may each have an oval-like cross-section but may have other cross-sectional shapes if desired.

Figure 39:
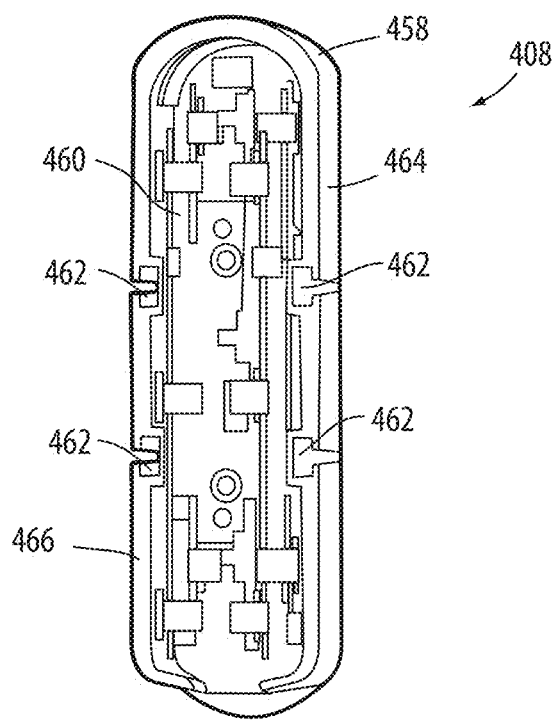
FIG. 39 is a top perspective view of a housing compartment of an electrical receptacle block.
Figure 40:
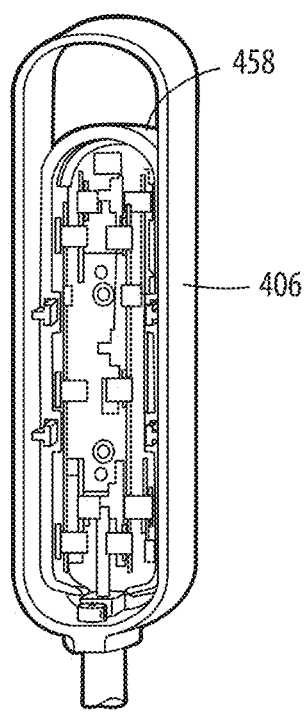
FIG. 40 illustrates the housing compartment secured within the impact loop.
Figure 41:
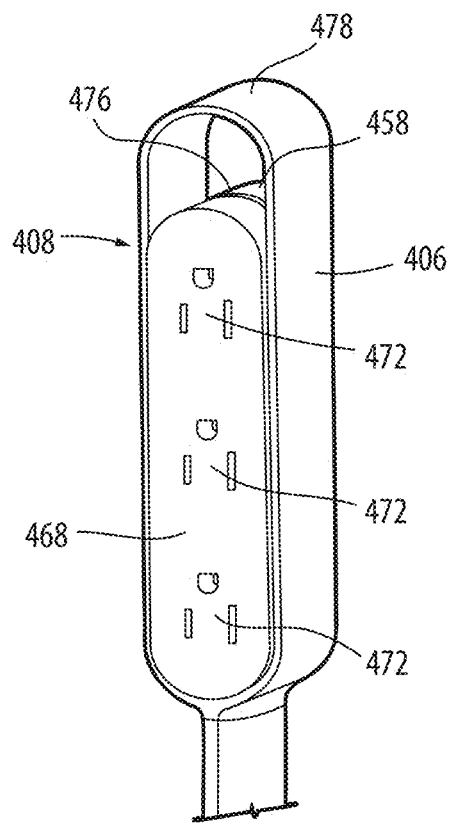
FIG. 41 is a front perspective view of the electrical receptacle block having electrical receptacles arranged in a ground up configuration.
Figure 42:
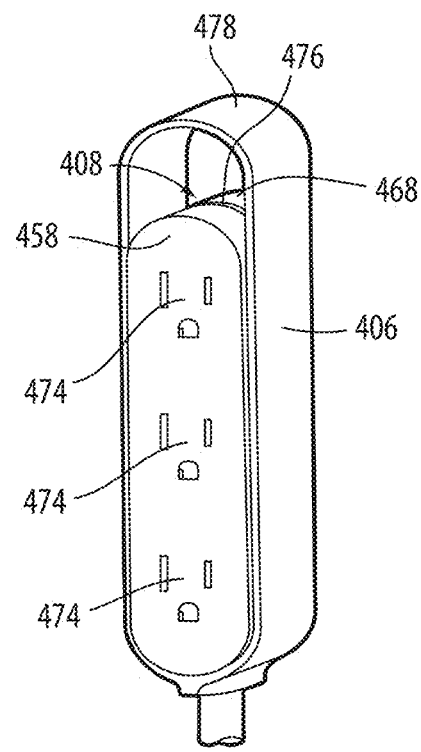
FIG. 42 is a rear perspective view of the electrical receptacle block having electrical receptacles arranged in a ground down configuration.

Referring to FIG. 39, the electrical receptacle block 408 is shown according to one embodiment. The electrical receptacle block 408 may include a housing compartment 458 for storing a bus bar assembly 460 that is electrically coupled to the power cord 412. The housing compartment 458 may include a number of T-shaped depressions 462 that each extend into opposing side walls 464 and 466 to receive a complementary one of the T-shaped rails 450 of the impact loop 406, thereby allowing the housing compartment 458 to be guided into the cavity 440 of the impact loop 406 as shown in FIG. 40. As shown in FIG. 41, the electrical receptacle block 408 may include a faceplate 468 that may also include T-shaped depressions (not shown) positioned to allow the faceplate 468 to be guided into the cavity 440 of the impact loop 406 to cover the housing compartment 458. The faceplate 468 may be snappedly engaged to the housing compartment 458 or otherwise coupled thereto to help prevent tampering of the bus bar assembly 460. The bus bar assembly 460 may be configured such that one or more electrical receptacles 472 are provided on the faceplate 468 as shown in FIG. 41 and one or more electrical receptacles 474 are provided on the rear of the housing compartment 458 as shown in FIG. 42. According to the illustrated embodiment, the electrical receptacles 472 provided on the faceplate 468 may each correspond to a NEMA type receptacle oriented in a ground up configuration. The electrical receptacles 474 provided on the rear of the housing compartment 458 may also each correspond to a NEMA type receptacle and may be oriented in a ground down configuration. However, it should be appreciated that other types of electrical receptacle arrangements are possible and their orientation along with the type of plug they accept may differ if desired.

As is further shown in FIGS. 41 and 42, the electrical receptacle block 408 may be dimensioned such that an upper portion 476 of the electrical receptacle block 408 is free and is spaced from an upper portion 478 (e.g., curved portion 446) of the impact loop 406. In such a configuration, when the power hub 400 is tipped, the upper portion 478 of the impact loop 406 may absorb contact with the ground, thereby lessening the amount of impact imparted to the electrical receptacle block 408. Thus, it should be appreciated that the impact loop 406 may be configured to not only house the electrical receptacle block 408 but may also generally serve to insulate the electrical receptacle block 408 from unwanted impact and may further serve as a means for a user to carry the power hub 400 by grasping the upper portion 478 of the impact loop 406.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A connection arrangement for a floor power distribution system, comprising:
    a hub arrangement configured to distribute electrical power within the floor power distribution system and including a hub housing and an electrical connector, the hub housing abutting a floor; and
    an adapter engaging the hub housing of the hub arrangement and abutting the floor, wherein at least a portion of the adapter is cantilevered over at least a portion of the hub housing, wherein the portion of the adapter that is cantilevered over the portion of the hub housing is vertically aligned with the electrical connector of the hub arrangement.

2. The connection arrangement of claim 1, wherein the adapter comprises an electrical connector that is complementary to the electrical connector of the hub arrangement, wherein the electrical connector of the adapter is vertically aligned with the electrical connector of the hub arrangement.

3. The connection arrangement of claim 2, wherein the electrical connector of the hub arrangement comprises an electrical receptacle located on the hub housing and the electrical connector of the adapter comprises a plurality of prongs configured to be received in the electrical receptacle and extending downwardly from the portion of the adapter that is cantilevered over the portion of the hub housing.

4. The connection arrangement of claim 1, further comprising:
    a seal member positioned between a downwardly facing surface of the adapter and an upwardly facing surface of the hub housing, wherein a vertical downward force exerted on the adapter compresses the seal member to form a substantially watertight seal between the adapter and the hub housing.

5. The connection arrangement of claim 4, wherein the seal member is secured to the downwardly facing surface of the adapter and is configured to surround the electrical connector of the adapter.

6. The connection arrangement of claim 4, wherein the seal member is configured to be substantially parallel to the floor.

7. The connection arrangement of claim 1, wherein the adapter comprises a door module, the door module having a door that is movable between a closed position to prevent access to the electrical connector and an open position to allow access to the electrical connector.

8. The connection arrangement of claim 7, further comprising:
    a plug arrangement configured to engage the electrical connector of the hub arrangement, the plug arrangement including a first surface that abuts the hub housing and a planar second surface that extends at an acute angle from the first surface, and wherein the door is configured to align and abut the second surface when the plug arrangement is engaged to the electrical connector of the hub arrangement.

9. The connection arrangement of claim 7, wherein the door module further comprises a recessed entryway that surrounds the electrical connector.

10. The connection arrangement of claim 7, wherein the door module further comprises a seal member that is secured to an underside of the door.

11. The connection arrangement of claim 1, wherein the hub arrangement comprises a plurality of electrical connectors, each located at a corresponding coupling area of the hub housing.

12. A connection arrangement for a power distribution system, comprising:
    a hub arrangement including a hub housing and a first electrical connector, the hub housing configured to abut a floor;
    a door module coupled to the hub housing and movable between a closed position preventing access to the first electrical connector, and an open position allowing access to the first electrical connector; and
    a plug arrangement including a plug housing and a second electrical connector that is complementary to the first electrical connector, the plug housing including a first surface that abuts the hub housing and a planar second surface that is arranged at an acute angle from the first surface, wherein the door abuts and is substantially aligned with the second surface when in the open position.

13. The connection arrangement of claim 12, wherein the door module further comprises a recessed entryway that surrounds the first electrical connector, and wherein the plug arrangement is received in the recessed entryway.

14. The connection arrangement of claim 12, further comprising:
    a seal member secured to the door, wherein the seal member forms a substantially water tight seal between the first and second electrical connectors.

15. The connection arrangement of claim 12, wherein the plug arrangement further includes an electrical supply coupled to the plug housing, the electrical supply extending at an angle relative to a longitudinal axis of the plug housing and a lateral axis of the plug housing.

16. A protective cap removably engaged to a pronged plug arrangement having a seal member, comprising:
    a body portion;
    a pair of downwardly extending bosses;
    a pair of opposing sidewalls; and
    a pair of guard walls extending across the body portion and adjoined to the sidewalls;
    wherein when the protective cap is in an engaged position:
        the bosses are snappedly engaged to openings in the plug arrangement;
        the body portion covers the prongs and the seal member; and
        the prongs are housed between the guard walls and the sidewalls.

17. The protective cap of claim 16, wherein the guard walls are parallel with each other.

18. The protective cap of claim 16, wherein the guard walls are perpendicular with the sidewalls.

19. The protective cap of claim 16, wherein the prongs run parallel to the guard walls and perpendicularly to the sidewalls when the protective cap is in the engaged position.

20. The protective cap of claim 16, wherein the guard walls abut or are spaced from the seal member when the protective cap is in the engaged position.

* * * * *

UNITED STATES PATENT AND TRADEMARK OFFICE
CERTIFICATE OF CORRECTION

PATENT NO. : 11,594,865 B2
APPLICATION NO. : 17/338875
DATED : February 28, 2023
INVENTOR(S) : Mark A. Schneider et al.

Page 1 of 2

It is certified that error appears in the above-identified patent and that said Letters Patent is hereby corrected as shown below:

In the Specification

Column 2, Line 12:
";" should be — , —

Column 2, Line 56:
After "view" insert -- of --

Column 3, Line 23:
After "is" insert -- a --

Column 4, Lines 39, 43:
"32" should be — 30 —

Column 4, Line 58:
"power-feed" should be — power in-feed —

Column 6, Line 37:
"plug" should be — plugged —

Column 6, Line 66:
"receptacles" should be — receptacle —

Column 7, Line 59:
"recess" should be — recessed —

Column 8, Line 7:
"compliment" should be — complement —

Signed and Sealed this
Second Day of January, 2024

Katherine Kelly Vidal
*Director of the United States Patent and Trademark Office*

CERTIFICATE OF CORRECTION (continued)
U.S. Pat. No. 11,594,865 B2

Column 10, Line 3:
"are" should be — area —

Column 10, Lines 23, 32:
"arrangements" should be — arrangement —

Column 10, Line 33:
After "arrangement" insert -- 30 --

Column 11, Line 38:
After "received" insert -- by --

Column 13, Lines 18, 23:
"portion" should be — areas —

Column 15, Line 25:
After "positioned" insert -- to --

Column 15, Line 65:
"sidewalls" should be — side walls —

Column 16, Lines 59, 62:
"complimentary" should be — complementary —

Column 17, Line 30:
"complimentary" should be — complementary —

In the Claims

Column 19, Claim 4, Lines 46-47:
";" should be — : —

Column 20, Claim 16, Line 55:
"sidewalls" should be — side walls —

Column 21, Claim 18, Line 2:
"sidewalls" should be — side walls —

Column 21, Claim 19, Line 4:
"sidewalls" should be — side walls —